US010803104B2

(12) United States Patent
Corbin, II et al.

(10) Patent No.: US 10,803,104 B2
(45) Date of Patent: Oct. 13, 2020

(54) DIGITAL CREDENTIAL FIELD MAPPING

(71) Applicant: Pearson Education, Inc., New York, NY (US)

(72) Inventors: James D. Corbin, II, Chandler, AZ (US); Quinn Lathrop, Portland, OR (US); Mark Mercury, Minneapolis, MN (US); Jarin Schmidt, Eden Prairie, MN (US)

(73) Assignee: PEARSON EDUCATION, INC., New York, NY (US)

( * ) Notice: Subject to any disclaimer, the term of this patent is extended or adjusted under 35 U.S.C. 154(b) by 239 days.

(21) Appl. No.: 15/801,021

(22) Filed: Nov. 1, 2017

(65) Prior Publication Data

US 2019/0129964 A1    May 2, 2019

(51) Int. Cl.
*G06F 16/29* (2019.01)
*G06F 16/33* (2019.01)
*G06F 16/31* (2019.01)
*G06F 16/335* (2019.01)
*G06F 40/279* (2020.01)
*G06F 40/284* (2020.01)

(52) U.S. Cl.
CPC .......... *G06F 16/3347* (2019.01); *G06F 16/29* (2019.01); *G06F 16/31* (2019.01); *G06F 16/337* (2019.01); *G06F 40/279* (2020.01); *G06F 40/284* (2020.01)

(58) Field of Classification Search
CPC ..................................................... G06F 16/00
See application file for complete search history.

(56) References Cited

U.S. PATENT DOCUMENTS

| 5,748,738 A | 5/1998 | Bisbee et al. |
| 5,781,732 A | 7/1998 | Adams |
| 5,963,649 A | 10/1999 | Sako |

(Continued)

FOREIGN PATENT DOCUMENTS

WO    2008/030759 A1    3/2008

OTHER PUBLICATIONS

Mozilla, Open Badges Backpack-ng (Next Generation), Jun. 2012, https://github.com/mozilla/openbadges-backpack, retrieved Nov. 28, 2017, pp. 1-5.

(Continued)

*Primary Examiner* — Khanh B Pham
(74) *Attorney, Agent, or Firm* — Quarles and Brady LLP

(57) ABSTRACT

Techniques described herein relate to mapping of digital credential objects to various field data objects. For example, requests may be received by a digital credential platform server from digital credential template owner devices, issuer devices, and/or receiver devices. In response, the digital credential platform server may determine and transmit back mappings between the digital credentials and the selected field data objects. To generate mappings, digital credential objects may be tokenize and transformed into vectors within a multi-dimensional vector space. Individual field data objects stored within a high-performance text search engine also may be transformed into vectors within the same multi-dimensional vector space, and the distances between the vectors may be calculated to select a number of field data objects corresponding to the digital credential objects.

18 Claims, 15 Drawing Sheets

(56) References Cited

U.S. PATENT DOCUMENTS

| | | | |
|---|---|---|---|
| 6,389,402 B1 | 5/2002 | Ginter et al. |
| 6,516,411 B2 | 2/2003 | Smith |
| 6,659,038 B2 | 12/2003 | Calcagano |
| 6,948,657 B2 | 9/2005 | Sugino et al. |
| 6,973,196 B2 | 12/2005 | Patton et al. |
| 6,988,199 B2 | 1/2006 | Toh et al. |
| 7,043,453 B2 | 5/2006 | Stefik et al. |
| 7,089,583 B2 | 8/2006 | Mehra et al. |
| 7,099,849 B1 | 8/2006 | Reeder et al. |
| 7,133,845 B1 | 11/2006 | Ginter et al. |
| 7,188,138 B1 | 3/2007 | Schneider et al. |
| 7,197,161 B2 | 3/2007 | Fan |
| 7,206,765 B2 | 4/2007 | Gilliam et al. |
| 7,206,941 B2 | 4/2007 | Raley et al. |
| 7,237,114 B1 | 6/2007 | Rosenberg |
| 7,237,144 B2 | 6/2007 | Safford et al. |
| 7,277,925 B2 | 10/2007 | Warnock |
| 7,278,168 B1 | 10/2007 | Chaudhury et al. |
| 7,302,634 B2 | 11/2007 | Lucovsky et al. |
| 7,328,245 B1 | 2/2008 | Hull et al. |
| 7,340,058 B2 | 3/2008 | Jakobsson et al. |
| 7,353,541 B1 | 4/2008 | Ishibashi et al. |
| 7,392,395 B2 | 6/2008 | Ginter et al. |
| 7,587,369 B2 | 9/2009 | Ginter et al. |
| 7,596,689 B2 | 9/2009 | Toh et al. |
| 7,660,902 B2 | 2/2010 | Graham et al. |
| 7,660,981 B1 | 2/2010 | Hunt |
| 7,665,141 B2 | 2/2010 | Young |
| 7,676,568 B2 | 3/2010 | Day |
| 7,725,723 B2 | 5/2010 | Landrock et al. |
| 7,743,259 B2 | 6/2010 | Raley et al. |
| 7,769,712 B2 | 8/2010 | Waldo et al. |
| 7,793,106 B2 | 9/2010 | Bugbee |
| 8,051,289 B2 | 11/2011 | Johnson et al. |
| 8,103,634 B2 | 1/2012 | Saito |
| 9,112,730 B2 | 8/2015 | Dewaele et al. |
| 9,373,002 B2 | 6/2016 | Johnson et al. |
| 9,589,183 B2 | 3/2017 | Brown |
| 9,729,411 B2 | 8/2017 | Purusothaman |
| 9,729,556 B2 | 8/2017 | Brock |
| 2001/0047326 A1 | 11/2001 | Broadbent et al. |
| 2002/0023140 A1 | 2/2002 | Hile et al. |
| 2002/0026574 A1 | 2/2002 | Watanabe |
| 2002/0026581 A1 | 2/2002 | Matsuyama |
| 2002/0037094 A1 | 3/2002 | Calcagno |
| 2002/0052896 A1 | 5/2002 | Streit et al. |
| 2002/0087861 A1 | 7/2002 | Segev et al. |
| 2002/0095389 A1 | 7/2002 | Gaines |
| 2002/0128844 A1 | 9/2002 | Wilson et al. |
| 2002/0143818 A1 | 10/2002 | Roberts et al. |
| 2002/0157015 A1 | 10/2002 | Gilbert et al. |
| 2003/0028494 A1 | 2/2003 | King et al. |
| 2003/0070072 A1 | 4/2003 | Nassiri |
| 2003/0182234 A1 | 9/2003 | Degroot |
| 2003/0187798 A1 | 10/2003 | McKinley et al. |
| 2003/0191653 A1 | 10/2003 | Birnbaum |
| 2003/0233563 A1 | 12/2003 | Kruse |
| 2004/0039704 A1 | 2/2004 | Gilliam et al. |
| 2004/0054893 A1 | 3/2004 | Ellis |
| 2004/0123111 A1 | 6/2004 | Makita et al. |
| 2004/0133793 A1 | 7/2004 | Ginter et al. |
| 2004/0220815 A1 | 11/2004 | Belanger et al. |
| 2004/0237035 A1 | 11/2004 | Cummins |
| 2005/0027558 A1 | 2/2005 | Yamamoto |
| 2005/0027568 A1 | 2/2005 | Dorris |
| 2005/0080682 A1 | 4/2005 | Wilson |
| 2005/0182821 A1 | 8/2005 | Chan et al. |
| 2005/0229258 A1 | 10/2005 | Pigin |
| 2005/0257253 A1 | 11/2005 | Ekers |
| 2005/0262339 A1 | 11/2005 | Fischer |
| 2005/0288939 A1 | 12/2005 | Peled et al. |
| 2006/0039304 A1 | 2/2006 | Singer et al. |
| 2006/0095831 A1 | 5/2006 | Kawada et al. |
| 2006/0180658 A1 | 8/2006 | Anderson |
| 2006/0282661 A1 | 12/2006 | True et al. |
| 2007/0006322 A1 | 1/2007 | Karimzadeh et al. |
| 2007/0038859 A1 | 2/2007 | Tadayon et al. |
| 2007/0074270 A1 | 3/2007 | Meehan et al. |
| 2007/0118735 A1 | 5/2007 | Cherrington et al. |
| 2007/0124584 A1 | 5/2007 | Gupta |
| 2007/0192140 A1 | 8/2007 | Gropper |
| 2007/0192609 A1 | 8/2007 | Yoshioka et al. |
| 2007/0220614 A1 | 9/2007 | Ellis et al. |
| 2007/0226488 A1 | 9/2007 | Lin et al. |
| 2007/0289022 A1 | 12/2007 | Wittkotter |
| 2008/0005024 A1 | 1/2008 | Kirkwood |
| 2008/0066181 A1 | 3/2008 | Haveson et al. |
| 2008/0091954 A1 | 4/2008 | Morris et al. |
| 2008/0106756 A1 | 5/2008 | Okamoto |
| 2008/0208873 A1 | 8/2008 | Boehmer |
| 2008/0235175 A1 | 9/2008 | Olive |
| 2008/0235236 A1 | 9/2008 | Olive |
| 2009/0172777 A1 | 7/2009 | Hansen et al. |
| 2010/0033739 A1 | 2/2010 | Phelan |
| 2010/0106645 A1 | 4/2010 | Peckover |
| 2010/0122093 A1 | 5/2010 | Tuyls et al. |
| 2010/0150448 A1 | 6/2010 | Lecerf et al. |
| 2010/0205649 A1 | 8/2010 | Becker |
| 2010/0217988 A1 | 8/2010 | Johnson |
| 2011/0040764 A1* | 2/2011 | Duchon ............... G06Q 10/04 707/738 |
| 2011/0320423 A1 | 12/2011 | Gemmell et al. |
| 2013/0086484 A1 | 4/2013 | Antin et al. |
| 2013/0097093 A1 | 4/2013 | Kolber et al. |
| 2013/0117400 A1 | 5/2013 | An |
| 2013/0340058 A1 | 12/2013 | Barnes et al. |
| 2014/0006615 A1 | 1/2014 | Karnik et al. |
| 2014/0122355 A1* | 5/2014 | Hardtke ............. G06Q 10/105 705/321 |
| 2014/0173748 A1 | 6/2014 | Esmailzdeh |
| 2014/0279587 A1 | 9/2014 | Gafford |
| 2014/0304181 A1 | 10/2014 | Kurien et al. |
| 2014/0348396 A1 | 11/2014 | Laaser et al. |
| 2014/0353369 A1 | 12/2014 | Malin et al. |
| 2014/0369602 A1 | 12/2014 | Meier et al. |
| 2015/0059003 A1 | 2/2015 | Bouse |
| 2015/0066612 A1 | 3/2015 | Karpoff et al. |
| 2015/0229623 A1 | 8/2015 | Grigg et al. |
| 2016/0232160 A1* | 8/2016 | Buhrmann .......... G06F 17/2247 |
| 2016/0267292 A1 | 9/2016 | Johnson et al. |
| 2017/0132464 A1 | 5/2017 | Brown |
| 2017/0279614 A1* | 9/2017 | Mercury ............... H04L 9/3247 |
| 2018/0107983 A1* | 4/2018 | Mir Ghaderi ...... G06Q 10/1053 |
| 2018/0253655 A1* | 9/2018 | Wang ..................... G06N 5/04 |

OTHER PUBLICATIONS

The Mozilla Foundation and Peer 2 Peer University in Collaboration With The MacArthur Foundation, "Open Badges for Lifelong Learning", updated Aug. 27, 2012, pp. 1-14.

Lester, Dave "Assertion Specification Changes", Mozilla/openbadges-backpack, last edited Apr. 16, 2013, 1 revision, https://github.com/mozilla/opengadges-backpack/wiki/Assertion-Specification-Changes, retrieved Nov. 28, 2017, pp. 1-3.

The Badge Alliance Standard Working Group "Open Badges Technical Specification", published May 1, 2015, http://web.archive.org/web/20160426204303 /https://openbadgespec.org/ retrieved Nov. 28, 2017, pp. 1-9.

Otto, Nate; Gylling, Markus, Editors, "Open Badges v2.0 IMS Candidate Final / Public Draft", IMS Global Learning Consortium, Mar. 8, 2017, htpp://www.imsglobal.org/Badges/OBv2p0/index.html, retrieved Nov. 28, 2017, pp. 1-17.

Mozilla, LRNG, IMS Global Learning Consortium, "What's an Open Badge?", https://opengadebs.ort/get-started/, retrieved Nov. 28, 2017, all pages.

Mozilla, LRNG, IMS Global Learning Consortium, "Developers Guide", copyright 2016, http://opengadges.org/developers/, retrieved Nov. 28, 2017, pp. 1-12.

Thompson, Matt, "Introducing Open Badges 1.0", The Mozilla Blog, Mar. 14, 2013 https://blog.mozilla.org/blog/2013/03/14/open_badges/, retrieved Nov. 29, 2017 pp. 1-11.

(56) References Cited

OTHER PUBLICATIONS

Grant, Sheryl, "What Counts as Learning, Open Digital Badges for New Opportunities", The digital Media + Learning Research Hub Report Series on Connected Learning, ISBN-13:978-0-9887255-3-9, published by the Digital Media and Learning Research Hub, Aug. 2014, pp. 1-57.

Pearson, "Open badges are unlocking the emerging jobs economy", 2013, pp. 1-7.

Open Badges Specification, vl .1, 01.05.2015, retrieved on Dec. 4, 2017, retrieved from the Internet <URL: https://openbadgespec.org/history/1.1-specification.html >, entire document.

White Paper—Open Badges are Unlocking the Emerging Jobs Economy, Dec. 31, 2013, retrieved on Apr. 13, 2017, retrieved from the Internet <URL: https://www.pearsoned.com/wp-contenUuploads/openbadges_unlockjobs.pdf >, entire document.

Chamilo/Chamilo-lms, "Get badges when the user has achieved skills-ref BT#9082", Feb. 12, 2015, downloaded from https://github.com/chamilo/chamilo-lms/commit/15d7e22521aa752f9a96840ae57d493250533671 on Feb. 16, 2018, 2 pages.

The Mozilla Foundation and Peer 2 Peer University, in collaboration with The MacArthur Foundation, "Open Badges for Life Long Learning", Jan. 23, 2012, 14 pages.

Smith; Sue, et al., "API Endpoints" retrieved from https://github.com/mozilla/badgekit-api/blob/master/docs/api-endpoints.md, Jul. 31, 2014, 4 pages.

Smith; Sue, "Badgekit API Documentation", retrieved from https://github.com/mozilla/badgekitapi/blob/master/docs/README.md, Jun. 13, 2014, 2 pages.

Smith; Sue, "Assessment", retrieved from https://github.com/mozilla/badgekit-api/blob/master/docs/assessment.md, Jun. 18, 2014, 19 pages.

Brianloveswords, "Authorization" retrieved from https://github.com/mozilla/badgekit-api/blob/master/docs/authorization.md, Mar. 3, 2014, 2 pages.

Smith; Sue, et al., "Badges" retrieved from https://github.com/mozilla/badgekit-api/blob/master/docs/badges.md, Jul. 31, 2014, 20 pages.

Smith; Sue, et al., "Claim Codes", retrieved from https://github.com/mozilla/badgekit-api/blob/master/docs/claim-codes.md, Jun. 18, 2014, 11 pages.

Smith; Sue, et al., "Issuers", retrieved from https://github.com/mozilla/badgekit-api/blob/master/docs/issuers.md, Jun. 16, 2014, 9 pages.

Smith; Sue, "Issuing", retrieved from https://github.com/mozilla/badgekit-api/blob/master/docs/issuing.md, Jun. 24, 2014, 7 pages.

Smith; Sue, et al., "Milestones", retrieved from https://github.com/mozilla/badgekit-api/blob/master/docs/milestones.md, Jun. 16, 2014, 15 pages.

Smith; Sue, et al., "Programs" retrieved from https://github.com/mozilla/badgekit-api/blob/master/docs/programs.md, Jun. 16, 2014, 8 pages.

Smith; Sue, et al., "Systems" retrieved from https://github.com/mozilla/badgekit-api/blob/master/docs/systems.md, Jun. 16, 2014, 9 pages.

Smith; Sue, et al., "SystemCallbacks (Webhooks)", retrieved from https://github.com/mozilla/badgekit-api/blob/master/docs/webhooks.md, Jun. 13, 2014, 4 pages.

Alicoding et al, "BadgeKit API", retrieved from https://github.com/mozilla/badgekit-api, Aug. 25, 2015, 3 pages.

\* cited by examiner

900 ⟶

901

Summary Report for:
13-2011.02 - Auditors

<u>Updated 2016</u>
Bright Outlook

Examine and analyze accounting records to determine financial status of establishment and prepare financial reports concerning operating procedures.

Sample of reported job titles: Assurance Manager, Assurance Senior, Audit Manager, Audit Partner, Auditor, Auditor-in-Charge, Financial Auditor, Internal Audit Director, Internal Auditor, Revenue Tax Specialist

| View report: | Summary | Details | Custom |

Tasks   Tools & Technology   Knowledge   Skills   Abilities   Work Activities   Detailed Work Activities   Work Context   Job Zone   Education   Credentials   Interests   Work Styles   Work Values   Related Occupations   Wages & Employment   Job Openings   Additional Information

Tasks
⊕  5 of 20 displayed

⊕ Prepare detailed reports on audit findings

⊕ Report to management about asset utilization and audit results, and recommend charges in operations and financial activities.

⊕ Collect and analyze data to detect deficient controls, duplicated effort, extravagance, fraud, or non-compliance with laws, regulations, and management policies.

⊕ Supervise auditing of establishments, and determine scope of investigation required.

⊕ Inspect account books and accounting systems for efficiency, effectiveness, and use of accepted accounting procedures to record transactions.

back to top

Tools & Technology
⊕  10 of 31 displayed

Tools used in this occupation:

⊕ Desktop computers

⊕ Laser fax machine – Laser facsimile machines

⊕ Notebook computers – Laptop computers

⊕ Personal digital assistant PDAs or organizers – Personal digital assistants PDA ⊕ Scanners – Computer data input scanners Technology used in this occupation:

⊕ Accounting software – Client billing software; Intuit QuickBooks ⚚; ProfitCents software; Sage 50 Accounting ⚚

⊕ Analytical or scientific software – ACL Audit Exchange; Guidance Software EnCase Enterprise; SAS software ⚚; WizSoft WizRule ⊕ Compliance software –- Intrax ProcedureNet; Paisley Cardmap; Sage HandiSort HandLedger; TrendTracker Compliance Solution ⊕ Enterprise resource planning ERP software ⚚ –- Microsoft Dynamics GP ⚚; Oracle PeopleSoft Financials ⚚; Oracle PeopleSoft software ⚚; SAP software ⚚

⊕ Financial analysis software –- Bi3 Financial Statement Fraud Analysis; CaseWare International IDEA SmartAnalyzer; Oracle E-Business Suite Financials ⚚; Thomson Reuters risk management software ⚚ Hot Technology – a technology requirement frequently included in emplloyer job postings.

back to top

Knowledge
⊕  5 of 7 displayed

FIG. 9

DIGITAL CREDENTIAL FIELD MAPPING

BACKGROUND

Changes in computing technologies have provided individuals with additional options for obtaining and validating technical skills and proficiencies. Rather than attending traditional educational institutions and professional training courses, many individuals may now obtain their technical skills and proficiencies from alternative sources, such as structured or unstructured and asynchronous eLearning programs using distance learning technology, self-study research without any direct supervision, or various alternative technical learning, training, and testing entities. Although such advances in technologies and increasing globalization trends provide many more options for individuals to obtain technical skills and proficiencies, they also present challenges in publishing, verifying, and tracking the sets of technical skills and proficiencies that these individuals have obtained. Many individuals and institutions no longer rely on physical certificates such as diplomas, transcripts, certification statements, and physical licenses, to verify the authenticity of an individual's proficiencies or qualifications. Instead, certain institutions may issue digital credentials (or digital badges) to qualifying individuals, and these digital credential earners may use the digital credentials to certify the skills or qualifications that the earner obtained vis-à-vis the institution.

BRIEF SUMMARY

Various techniques are described herein for analyzing, tokenizing, and mapping digital credential objects to one or more field data objects. In various embodiments, a digital credential platform server may receive requests from client devices identifying one or more digital credentials, and may use vector space modeling to select one or more field data objects based on the requests. For example, requests may be received from digital credential template owner devices, digital credential issuer devices, and/or digital credential receiver devices, and in response, a platform server may determine and transmit back mappings between the digital credentials and selected field data objects. In some embodiments, the digital credential platform server may receive requests including digital credential objects and/or data identifying digital credential objects, and then may tokenize and transform the digital credential objects into vectors within a multi-dimensional vector space. The digital credential platform server also may access a field data object store, for example, implemented within a high-performance text search engine. Each field data object also may be transformed into a vector within the same multi-dimensional vector space, and the distances between the vectors may be calculated to select a number of closest-matching field data objects to the digital credential objects. After selecting the field data objects based on the vector distances, the digital credential platform server may generate the corresponding mappings and transmit the mappings back to the requesting device.

Additional techniques described herein relate to analyzing field data objects and creating one or more field data stores to be used in the multi-dimensional vector space mapping. For example, a plurality of field documents may be parsed and tokenized into field data objects comprising a plurality of different keywords within a number of predetermined data fields. These data objects may be stored within a high-speed index data structure, for example, using a software platform providing indexing and searching capabilities, as well as tokenization and data analysis capabilities. In some embodiments, the index structure may be a high-performance search service using web-based technologies (e.g. XML, HTTP, JSON, etc.), which provide secure access and support caching and replication. In some embodiments, different index structures for field data objects may be constructed for different regions, geographic locations, and/or computing environments, and the digital credential platform server may access the appropriate index structures depending on the corresponding region, location, and/or computing environment associated with the requesting client device and/or the digital credentials identified in the request.

Further techniques described herein relate to the data extraction, parsing, and tokenization processes used for digital credential objects and/or field data objects. In some examples, tokenization of digital credential objects may include parsing individual data fields to generate keywords, stemming each of the keywords, and determining one or more substitutes associated with each of the keywords. In some cases, particular data fields of the digital credential objects and/or field data objects might not be parsed into individual keywords, and multi-word keywords may be permitted. Additionally, in some embodiments, preprocessing and/or tokenization may be used to generate a single aggregated digital credential object from a plurality of digital credential objects identified within a request, whereas in other embodiments, rather than generating a single aggregated digital credential object, each of the multiple digital credential objects may be transformed into a separate vector within the multi-dimensional vector space, and separate sets of distances may be calculated based on each vector.

BRIEF DESCRIPTION OF THE DRAWINGS

FIG. 9 is an example user interface screen displaying a field/occupation document, according to one or more embodiments of the disclosure.

Figure 1:
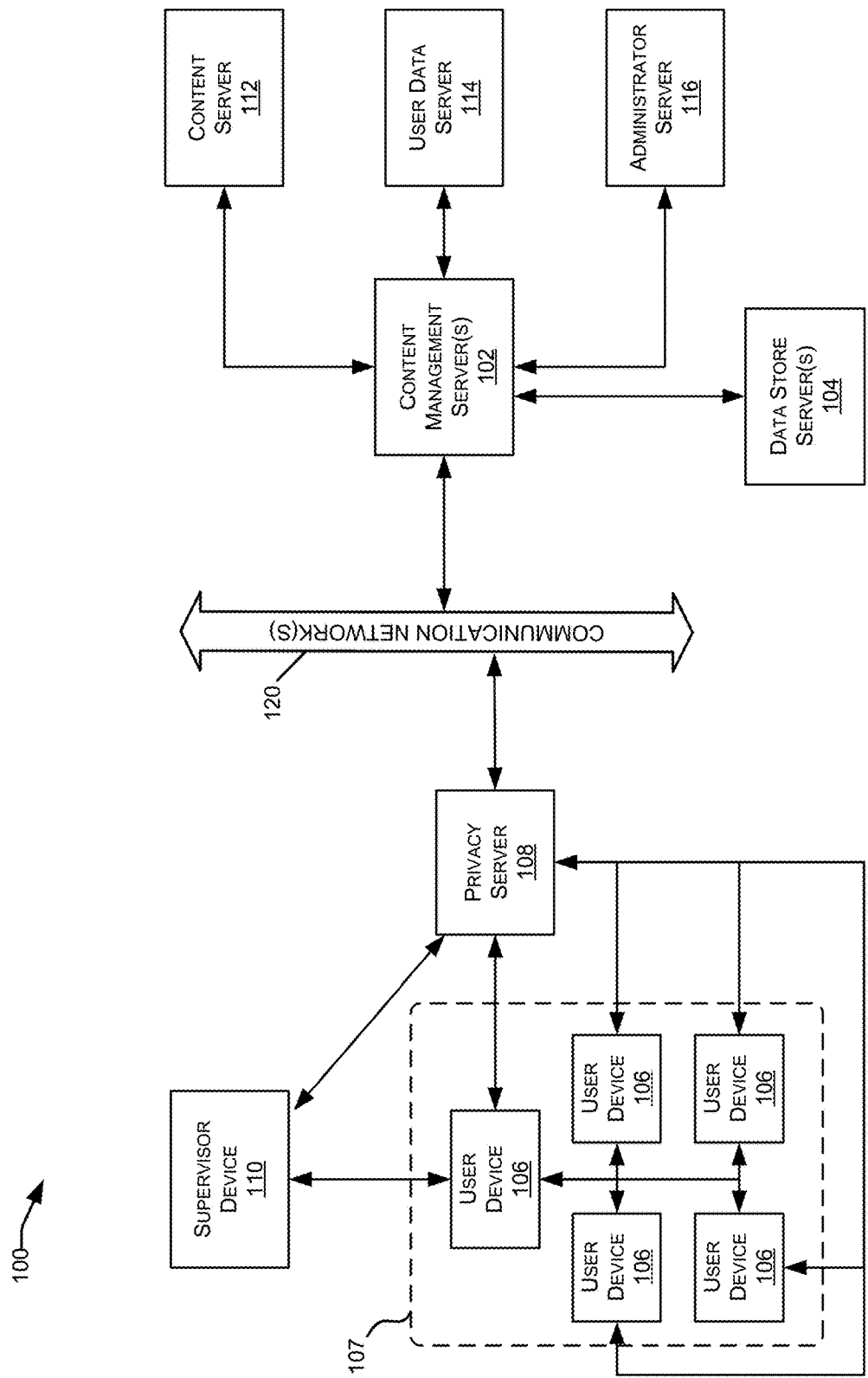
FIG. 1 is a block diagram showing illustrating an example of a content distribution network.

In the appended figures, similar components and/or features may have the same reference label. Further, various compo of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides illustrative embodiment(s) only and is not intended to limit the scope, applicability or configuration of the disclosure. Rather, the ensuing description of the illustrative embodiment(s) will provide those skilled in the art with an enabling description for implementing a preferred exemplary embodiment. It is understood that various changes can be made in the function and arrangement of elements without departing from the spirit and scope as set forth in the appended claims.

Various techniques (e.g., systems, methods, computer-program products tangibly embodied in a non-transitory machine-readable storage medium, etc.) are described herein for analyzing and tokenizing sets of digital credentials, and then mapping the digital credentials to one or more field data objects. In various embodiments, a digital credential platform server may receive requests from client devices identifying one or more digital credentials, and may use vector space modeling to select field data objects in response to the requests. For example, requests may be received from digital credential template owner devices, digital credential issuer devices, and/or digital credential receiver devices, including digital credential objects and/or data identifying digital credential objects. In response to such requests, a digital credential platform server may determine and transmit back mappings between the identified digital credentials and one or more selected field data objects. In some embodiments, the digital credential platform server may tokenize and transform the digital credential objects into vectors within a multi-dimensional vector space. The digital credential platform server then may access a data store containing field data objects, and may use vector space modeling to compute one or more closest matching field data objects to the digital credential objects. In some cases, each field data object also may be transformed into a vector within the same multi-dimensional vector space, and the distances between the vectors may be calculated to select a number of closest matching field data objects to the digital credential objects. For example, in some embodiments, a high-performance text search engine may implement be configured to receive queries corresponding to the digital credential objects, and to implement the vector space modeling internally to determine the closest-matching field objects. After selecting the field data objects based on the vector distances, the digital credential platform server may generate the corresponding mappings (e.g., digital credentials to fields) and transmit the mappings back to the requesting device.

Additional techniques described herein relate to analyzing field data objects and creating one or more field data stores to be used in the multi-dimensional vector space mapping. For example, a plurality of field documents (e.g., occupation-related documents, job listings, etc.) may be parsed and tokenized into field data objects comprising a plurality of different keywords within a number of predetermined data fields. These data objects may be stored within a high-speed index data structure, for example, using a software platform providing indexing and searching capabilities, as well as tokenization and data analysis capabilities. In some embodiments, the index structure may be a high-performance search service using web-based technologies (e.g. XML, HTTP, JSON, etc.), which provide secure access and support caching and replication. In some embodiments, different index structures for field data objects may be constructed for different regions, geographic locations, and/or computing environments, and the digital credential platform server may access the appropriate index structures depending on the corresponding region, location, and/or computing environment associated with the requesting client device and/or the digital credentials identified in the request.

Further techniques described herein relate to the data extraction, parsing, and tokenization processes used for digital credential objects and/or field data objects. In some examples, tokenization of digital credential objects may include parsing individual data fields to generate keywords, stemming each of the keywords, and determining one or more substitutes associated with each of the keywords (e.g., keyword synonyms). In some cases, particular data fields of the digital credential objects and/or field data objects might not be parsed into individual keywords, and multi-word keywords may be permitted. Additionally, in some embodiments, preprocessing and/or tokenization may be used to generate a single aggregated digital credential object from a plurality of digital credential objects identified within a request, whereas in other embodiments, rather than generating a single aggregated digital credential object, each of the multiple digital credential objects may be transformed into a separate vector within the multi-dimensional vector space, and separate sets of distances may be calculated based on each vector.

With reference now to FIG. 1, a block diagram is shown illustrating various components of a content distribution network (CDN) 100 which implements and supports certain embodiments and features described herein. Content distribution network 100 may include one or more content management servers 102. As discussed below in more detail, content management servers 102 may be any desired type of server including, for example, a rack server, a tower server, a miniature server, a blade server, a mini rack server, a mobile server, an ultra-dense server, a super server, or the like, and may include various hardware components, for example, a motherboard, a processing units, memory systems, hard drives, network interfaces, power supplies, etc. Content management server 102 may include one or more server farms, clusters, or any other appropriate arrangement and/or combination or computer servers. Content management server 102 may act according to stored instructions located in a memory subsystem of the server 102, and may run an operating system, including any commercially available server operating system and/or any other operating systems discussed herein.

The content distribution network 100 may include one or more data store servers 104, such as database servers and file-based storage systems. Data stores 104 may comprise stored data relevant to the functions of the content distribution network 100. Illustrative examples of data stores 104 that may be maintained in certain embodiments of the content distribution network 100 are described below in reference to FIG. 3. In some embodiments, multiple data stores may reside on a single server 104, either using the same storage components of server 104 or using different physical storage components to assure data security and integrity between data stores. In other embodiments, each data store may have a separate dedicated data store server 104.

Content distribution network 100 also may include one or more user devices 106 and/or supervisor devices 110. User devices 106 and supervisor devices 110 may display content received via the content distribution network 100, and may support various types of user interactions with the content. User devices 106 and supervisor devices 110 may include mobile devices such as smartphones, tablet computers, personal digital assistants, and wearable computing devices. Such mobile devices may run a variety of mobile operating systems, and may be enabled for Internet, e-mail, short message service (SMS), Bluetooth®, mobile radio-frequency identification (M-RFID), and/or other communication protocols. Other user devices 106 and supervisor devices 110 may be general purpose personal computers or special-purpose computing devices including, by way of example, personal computers, laptop computers, workstation computers, projection devices, and interactive room display systems. Additionally, user devices 106 and supervisor devices 110 may be any other electronic devices, such as thin-client computers, Internet-enabled gaming systems, business or home appliances, and/or personal messaging devices, capable of communicating over network(s) 120.

In different contexts of content distribution networks 100, user devices 106 and supervisor devices 110 may correspond to different types of specialized devices, for example, student devices and teacher devices in an educational network, employee devices and presentation devices in a company network, different gaming devices in a gaming network, etc. In some embodiments, user devices 106 and supervisor devices 110 may operate in the same physical location 107, such as a classroom or conference room. In such cases, the devices may contain components that support direct communications with other nearby devices, such as a wireless transceivers and wireless communications interfaces, Ethernet sockets or other Local Area Network (LAN) interfaces, etc. In other implementations, the user devices 106 and supervisor devices 110 need not be used at the same location 107, but may be used in remote geographic locations in which each user device 106 and supervisor device 110 may use security features and/or specialized hardware (e.g., hardware-accelerated SSL and HTTPS, WS-Security, firewalls, etc.) to communicate with the content management server 102 and/or other remotely located user devices 106. Additionally, different user devices 106 and supervisor devices 110 may be assigned different designated roles, such as presenter devices, teacher devices, administrator devices, or the like, and in such cases the different devices may be provided with additional hardware and/or software components to provide content and support user capabilities not available to the other devices.

The content distribution network 100 also may include a privacy server 108 that maintains private user information at the privacy server 108 while using applications or services hosted on other servers. For example, the privacy server 108 may be used to maintain private data of a user within one jurisdiction even though the user is accessing an application hosted on a server (e.g., the content management server 102) located outside the jurisdiction. In such cases, the privacy server 108 may intercept communications between a user device 106 or supervisor device 110 and other devices that include private user information. The privacy server 108 may create a token or identifier that does not disclose the private information and may use the token or identifier when communicating with the other servers and systems, instead of using the user's private information.

As illustrated in FIG. 1, the content management server 102 may be in communication with one or more additional servers, such as a content server 112, a user data server 112, and/or an administrator server 116. Each of these servers may include some or all of the same physical and logical components as the content management server(s) 102, and in some cases, the hardware and software components of these servers 112-116 may be incorporated into the content management server(s) 102, rather than being implemented as separate computer servers.

Content server 112 may include hardware and software components to generate, store, and maintain the content resources for distribution to user devices 106 and other devices in the network 100. For example, in content distribution networks 100 used for professional training and educational purposes, content server 112 may include data stores of training materials, presentations, interactive programs and simulations, course models, course outlines, and various training interfaces that correspond to different materials and/or different types of user devices 106. In content distribution networks 100 used for media distribution, interactive gaming, and the like, a content server 112 may include media content files such as music, movies, television programming, games, and advertisements.

User data server 114 may include hardware and software components that store and process data for multiple users relating to each user's activities and usage of the content distribution network 100. For example, the content management server 102 may record and track each user's system usage, including their user device 106, content resources accessed, and interactions with other user devices 106. This data may be stored and processed by the user data server 114, to support user tracking and analysis features. For instance, in the professional training and educational contexts, the user data server 114 may store and analyze each user's training materials viewed, presentations attended, courses completed, interactions, evaluation results, and the like. The user data server 114 may also include a repository for user-generated material, such as evaluations and tests completed by users, and documents and assignments prepared by users. In the context of media distribution and interactive gaming, the user data server 114 may store and process resource access data for multiple users (e.g., content titles accessed, access times, data usage amounts, gaming histories, user devices and device types, etc.).

Administrator server 116 may include hardware and software components to initiate various administrative functions at the content management server 102 and other components within the content distribution network 100. For example, the administrator server 116 may monitor device status and performance for the various servers, data stores, and/or user devices 106 in the content distribution network 100. When necessary, the administrator server 116 may add or remove devices from the network 100, and perform device maintenance such as providing software updates to the devices in the network 100. Various administrative tools on the administrator server 116 may allow authorized users to set user access permissions to various content resources, monitor resource usage by users and devices 106, and perform analyses and generate reports on specific network users and/or devices (e.g., resource usage tracking reports, training evaluations, etc.).

The content distribution network 100 may include one or more communication networks 120. Although only a single network 120 is identified in FIG. 1, the content distribution network 100 may include any number of different communication networks between any of the computer servers and devices shown in FIG. 1 and/or other devices described herein. Communication networks 120 may enable communication between the various computing devices, servers, and other components of the content distribution network 100. As discussed below, various implementations of content distribution networks 100 may employ different types of networks 120, for example, computer networks, telecommunications networks, wireless networks, and/or any combination of these and/or other networks.

Figure 2:
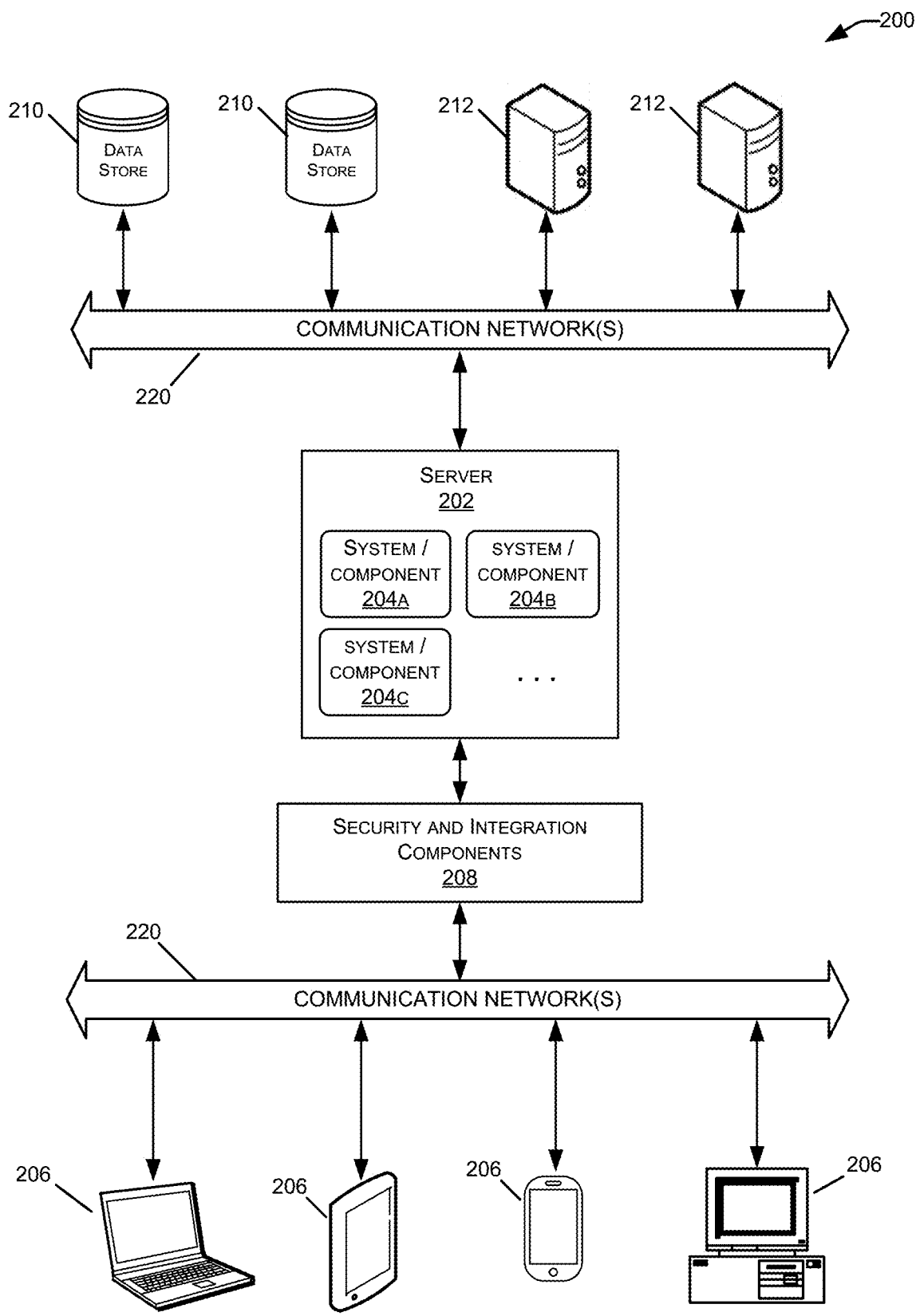
FIG. 2 is a block diagram illustrating a computer server and computing environment within a content distribution network.

With reference to FIG. 2, an illustrative distributed computing environment 200 is shown including a computer server 202, four client computing devices 206, and other components that may implement certain embodiments and features described herein. In some embodiments, the server 202 may correspond to the content management server 102 discussed above in FIG. 1, and the client computing devices 206 may correspond to the user devices 106. However, the computing environment 200 illustrated in FIG. 2 may correspond to any other combination of devices and servers configured to implement a client-server model or other distributed computing architecture.

Client devices 206 may be configured to receive and execute client applications over one or more networks 220. Such client applications may be web browser based applications and/or standalone software applications, such as mobile device applications. Server 202 may be communicatively coupled with the client devices 206 via one or more communication networks 220. Client devices 206 may receive client applications from server 202 or from other application providers (e.g., public or private application stores). Server 202 may be configured to run one or more server software applications or services, for example, web-based or cloud-based services, to support content distribution and interaction with client devices 206. Users operating client devices 206 may in turn utilize one or more client applications (e.g., virtual client applications) to interact with server 202 to utilize the services provided by these components.

Various different subsystems and/or components 204 may be implemented on server 202. Users operating the client devices 206 may initiate one or more client applications to use services provided by these subsystems and components. The subsystems and components within the server 202 and client devices 206 may be implemented in hardware, firmware, software, or combinations thereof. Various different system configurations are possible in different distributed computing systems 200 and content distribution networks 100. The embodiment shown in FIG. 2 is thus one example of a distributed computing system and is not intended to be limiting.

Although exemplary computing environment 200 is shown with four client computing devices 206, any number of client computing devices may be supported. Other devices, such as specialized sensor devices, etc., may interact with client devices 206 and/or server 202.

As shown in FIG. 2, various security and integration components 208 may be used to transmit, receive, and manage communications between the server 202 and user devices 206 over one or more communication networks 220. The security and integration components 208 may include separate servers, such as web servers and/or authentication servers, and/or specialized networking components, such as firewalls, routers, gateways, load balancers, and the like. In some cases, the security and integration components 208 may correspond to a set of dedicated hardware and/or software operating at the same physical location and under the control of same entities as server 202. For example, components 208 may include one or more dedicated web servers and network hardware in a datacenter or a cloud infrastructure. In other examples, the security and integration components 208 may correspond to separate hardware and software components which may be operated at a separate physical location and/or by a separate entity.

Security and integration components 208 may implement various security features for data transmission and storage, such as authenticating users and restricting access to unknown or unauthorized users. In various implementations, security and integration components 208 may provide, for example, a file-based integration scheme or a service-based integration scheme for transmitting data between the various devices in the content distribution network 100. Security and integration components 208 also may use secure data transmission protocols and/or encryption for data transfers, for example, File Transfer Protocol (FTP), Secure File Transfer Protocol (SFTP), and/or Pretty Good Privacy (PGP) encryption.

In some embodiments, one or more web services may be implemented within the security and integration components 208 and/or elsewhere within the content distribution network 100. Such web services, including cross-domain and/or cross-platform web services, may be developed for enterprise use in accordance with various web service standards, such as RESTful web services (i.e., services based on the Representation State Transfer (REST) architectural style and constraints), and/or web services designed in accordance with the Web Service Interoperability (WS-I) guidelines. Some web services may use the Secure Sockets Layer (SSL) or Transport Layer Security (TLS) protocol to provide secure connections between the server 202 and user devices 206. SSL or TLS may use HTTP or HTTPS to provide authentication and confidentiality. In other examples, web services may be implemented using REST over HTTPS with the OAuth open standard for authentication, or using the WS-Security standard which provides for secure SOAP messages using XML encryption. In other examples, the security and integration components 208 may include specialized hardware for providing secure web services. For example, security and integration components 208 may include secure network appliances having built-in features such as hardware-accelerated SSL and HTTPS, WS-Security, and firewalls. Such specialized hardware may be installed and configured in front of any web servers, so that any external devices may communicate directly with the specialized hardware.

Communication network(s) 220 may be any type of network familiar to those skilled in the art that can support data communications using any of a variety of commercially-available protocols, including without limitation, TCP/IP (transmission control protocol/Internet protocol), SNA (systems network architecture), IPX (Internet packet exchange), Secure Sockets Layer (SSL) or Transport Layer Security (TLS) protocols, Hyper Text Transfer Protocol (HTTP) and Secure Hyper Text Transfer Protocol (HTTPS), Bluetooth®, Near Field Communication (NFC), and the like. Merely by way of example, network(s) 220 may be local area networks (LAN), such as one based on Ethernet, Token-Ring and/or the like. Network(s) 220 also may be wide-area networks, such as the Internet. Networks 220 may include telecommunication networks such as a public switched telephone networks (PSTNs), or virtual networks such as an intranet or an extranet. Infrared and wireless networks (e.g., using the Institute of Electrical and Electronics (IEEE) 802.11 protocol suite or other wireless protocols) also may be included in networks 220.

Computing environment 200 also may include one or more data stores 210 and/or back-end servers 212. In certain examples, the data stores 210 may correspond to data store server(s) 104 discussed above in FIG. 1, and back-end servers 212 may correspond to the various back-end servers 112-116. Data stores 210 and servers 212 may reside in the same datacenter or may operate at a remote location from server 202. In some cases, one or more data stores 210 may reside on a non-transitory storage medium within the server 202. Other data stores 210 and back-end servers 212 may be remote from server 202 and configured to communicate with server 202 via one or more networks 220. In certain embodiments, data stores 210 and back-end servers 212 may reside in a storage-area network (SAN), or may use storage-as-a-service (STaaS) architectural model.

Figure 3:
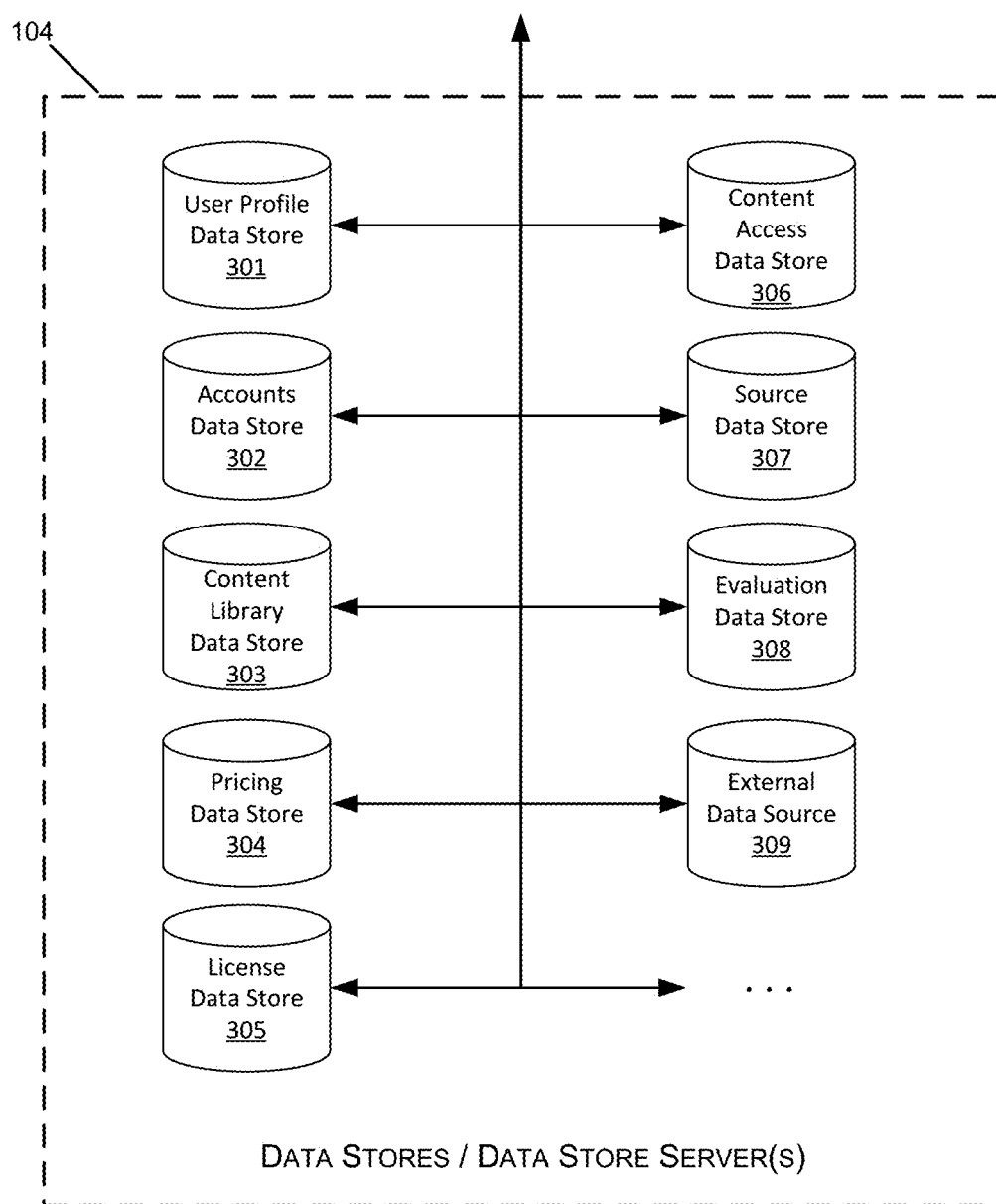
FIG. 3 is a block diagram illustrating an embodiment of one or more data store servers within a content distribution network.

With reference to FIG. 3, an illustrative set of data stores and/or data store servers is shown, corresponding to the data store servers 104 of the content distribution network 100 discussed above in FIG. 1. One or more individual data stores 301-309 may reside in storage on a single computer server 104 (or a single server farm or cluster) under the control of a single entity, or may reside on separate servers operated by different entities and/or at remote locations. In some embodiments, data stores 301-309 may be accessed by the content management server 102 and/or other devices and servers within the network 100 (e.g., user devices 106, supervisor devices 110, administrator servers 116, etc.). Access to one or more of the data stores 301-309 may be limited or denied based on the processes, user credentials, and/or devices attempting to interact with the data store.

The paragraphs below describe examples of specific data stores that may be implemented within some embodiments of a content distribution network 100. It should be understood that the below descriptions of data stores 301-309, including their functionality and types of data stored therein, are illustrative and non-limiting. Data stores server architecture, design, and the execution of specific data stores 301-309 may depend on the context, size, and functional requirements of a content distribution network 100. For example, in content distribution systems 100 used for professional training and educational purposes, separate databases or file-based storage systems may be implemented in data store server(s) 104 to store trainee and/or student data, trainer and/or professor data, training module data and content descriptions, training results, evaluation data, and the like. In contrast, in content distribution systems 100 used for media distribution from content providers to subscribers, separate data stores may be implemented in data stores server(s) 104 to store listings of available content titles and descriptions, content title usage statistics, subscriber profiles, account data, payment data, network usage statistics, etc.

A user profile data store 301 may include information relating to the end users within the content distribution network 100. This information may include user characteristics such as the user names, access credentials (e.g., logins and passwords), user preferences, and information relating to any previous user interactions within the content distribution network 100 (e.g., requested content, posted content, content modules completed, training scores or evaluations, other associated users, etc.).

An accounts data store 302 may generate and store account data for different users in various roles within the content distribution network 100. For example, accounts may be created in an accounts data store 302 for individual end users, supervisors, administrator users, and entities such as companies or educational institutions. Account data may include account types, current account status, account characteristics, and any parameters, limits, restrictions associated with the accounts.

A content library data store 303 may include information describing the individual content items (or content resources) available via the content distribution network 100. In some embodiments, the library data store 303 may include metadata, properties, and other characteristics associated with the content resources stored in the content server 112. Such data may identify one or more aspects or content attributes of the associated content resources, for example, subject matter, access level, or skill level of the content resources, license attributes of the content resources (e.g., any limitations and/or restrictions on the licensable use and/or distribution of the content resource), price attributes of the content resources (e.g., a price and/or price structure for determining a payment amount for use or distribution of the content resource), rating attributes for the content resources (e.g., data indicating the evaluation or effectiveness of the content resource), and the like. In some embodiments, the library data store 303 may be configured to allow updating of content metadata or properties, and to allow the addition and/or removal of information relating to the content resources. For example, content relationships may be implemented as graph structures, which may be stored in the library data store 303 or in an additional store for use by selection algorithms along with the other metadata.

A pricing data store 304 may include pricing information and/or pricing structures for determining payment amounts for providing access to the content distribution network 100 and/or the individual content resources within the network 100. In some cases, pricing may be determined based on a user's access to the content distribution network 100, for example, a time-based subscription fee, or pricing based on network usage and. In other cases, pricing may be tied to specific content resources. Certain content resources may have associated pricing information, whereas other pricing determinations may be based on the resources accessed, the profiles and/or accounts of the user, and the desired level of access (e.g., duration of access, network speed, etc.). Additionally, the pricing data store 304 may include information relating to compilation pricing for groups of content resources, such as group prices and/or price structures for groupings of resources.

A license data store 305 may include information relating to licenses and/or licensing of the content resources within the content distribution network 100. For example, the license data store 305 may identify licenses and licensing terms for individual content resources and/or compilations of content resources in the content server 112, the rights holders for the content resources, and/or common or large-scale right holder information such as contact information for rights holders of content not included in the content server 112.

A content access data store 306 may include access rights and security information for the content distribution network 100 and specific content resources. For example, the content access data store 306 may include login information (e.g., user identifiers, logins, passwords, etc.) that can be verified during user login attempts to the network 100. The content access data store 306 also may be used to store assigned user roles and/or user levels of access. For example, a user's access level may correspond to the sets of content resources and/or the client or server applications that the user is permitted to access. Certain users may be permitted or denied access to certain applications and resources based on their subscription level, training program, course/grade level, etc. Certain users may have supervisory access over one or more end users, allowing the supervisor to access all or portions of the end user's content, activities, evaluations, etc. Additionally, certain users may have administrative access over some users and/or some applications in the content management network 100, allowing such users to add and remove user accounts, modify user access permissions, perform maintenance updates on software and servers, etc.

A source data store 307 may include information relating to the source of the content resources available via the content distribution network. For example, a source data store 307 may identify the authors and originating devices of content resources, previous pieces of data and/or groups of data originating from the same authors or originating devices, and the like.

An evaluation data store 308 may include information used to direct the evaluation of users and content resources in the content management network 100. In some embodiments, the evaluation data store 308 may contain, for example, the analysis criteria and the analysis guidelines for evaluating users (e.g., trainees/students, gaming users, media content consumers, etc.) and/or for evaluating the content resources in the network 100. The evaluation data store 308 also may include information relating to evaluation processing tasks, for example, the identification of users and user devices 106 that have received certain content resources or accessed certain applications, the status of evaluations or evaluation histories for content resources, users, or applications, and the like. Evaluation criteria may be stored in the evaluation data store 308 including data and/or instructions in the form of one or several electronic rubrics or scoring guides for use in the evaluation of the content, users, or applications. The evaluation data store 308 also may include past evaluations and/or evaluation analyses for users, content, and applications, including relative rankings, characterizations, explanations, and the like.

In addition to the illustrative data stores described above, data store server(s) 104 (e.g., database servers, file-based storage servers, etc.) may include one or more external data aggregators 309. External data aggregators 309 may include third-party data sources accessible to the content management network 100, but not maintained by the content management network 100. External data aggregators 309 may include any electronic information source relating to the users, content resources, or applications of the content distribution network 100. For example, external data aggregators 309 may be third-party data stores containing demographic data, education related data, consumer sales data, health related data, and the like. Illustrative external data aggregators 309 may include, for example, social networking web servers, public records data stores, learning management systems, educational institution servers, business servers, consumer sales data stores, medical record data stores, etc. Data retrieved from various external data aggregators 309 may be used to verify and update user account information, suggest user content, and perform user and content evaluations.

Figure 4:
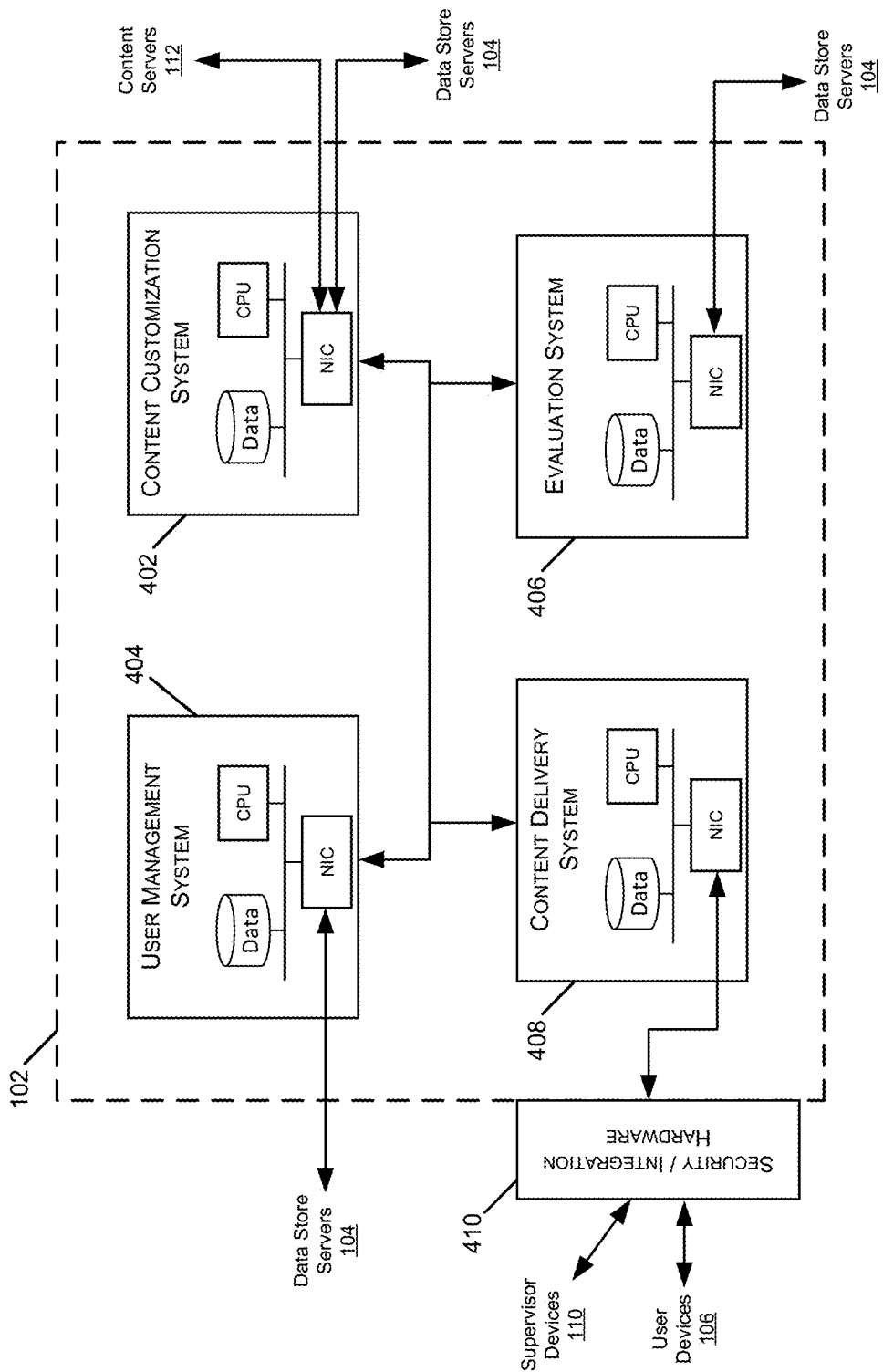
FIG. 4 is a block diagram illustrating an embodiment of one or more content management servers within a content distribution network.

With reference now to FIG. 4, a block diagram is shown illustrating an embodiment of one or more content management servers 102 within a content distribution network 100. As discussed above, content management server(s) 102 may include various server hardware and software components that manage the content resources within the content distribution network 100 and provide interactive and adaptive content to users on various user devices 106. For example, content management server(s) 102 may provide instructions to and receive information from the other devices within the content distribution network 100, in order to manage and transmit content resources, user data, and server or client applications executing within the network 100.

A content management server 102 may include a content customization system 402. The content customization system 402 may be implemented using dedicated hardware within the content distribution network 100 (e.g., a content customization server 402), or using designated hardware and software resources within a shared content management server 102. In some embodiments, the content customization system 402 may adjust the selection and adaptive capabilities of content resources to match the needs and desires of the users receiving the content. For example, the content customization system 402 may query various data stores and servers 104 to retrieve user information, such as user preferences and characteristics (e.g., from a user profile data store 301), user access restrictions to content recourses (e.g., from a content access data store 306), previous user results and content evaluations (e.g., from an evaluation data store 308), and the like. Based on the retrieved information from data stores 104 and other data sources, the content customization system 402 may modify content resources for individual users.

A content management server 102 also may include a user management system 404. The user management system 404 may be implemented using dedicated hardware within the content distribution network 100 (e.g., a user management server 404), or using designated hardware and software resources within a shared content management server 102. In some embodiments, the user management system 404 may monitor the progress of users through various types of content resources and groups, such as media compilations, courses or curriculums in training or educational contexts, interactive gaming environments, and the like. For example, the user management system 404 may query one or more databases and/or data store servers 104 to retrieve user data such as associated content compilations or programs, content completion status, user goals, results, and the like.

A content management server 102 also may include an evaluation system 406. The evaluation system 406 may be implemented using dedicated hardware within the content distribution network 100 (e.g., an evaluation server 406), or using designated hardware and software resources within a shared content management server 102. The evaluation system 406 may be configured to receive and analyze information from user devices 106. For example, various ratings of content resources submitted by users may be compiled and analyzed, and then stored in a data store (e.g., a content library data store 303 and/or evaluation data store 308) associated with the content. In some embodiments, the evaluation server 406 may analyze the information to determine the effectiveness or appropriateness of content resources with, for example, a subject matter, an age group, a skill level, or the like. In some embodiments, the evaluation system 406 may provide updates to the content customization system 402 or the user management system 404, with the attributes of one or more content resources or groups of resources within the network 100. The evaluation system 406 also may receive and analyze user evaluation data from user devices 106, supervisor devices 110, and administrator servers 116, etc. For instance, evaluation system 406 may receive, aggregate, and analyze user evaluation data for different types of users (e.g., end users, supervisors, administrators, etc.) in different contexts (e.g., media consumer ratings, trainee or student comprehension levels, teacher effectiveness levels, gamer skill levels, etc.).

A content management server 102 also may include a content delivery system 408. The content delivery system 408 may be implemented using dedicated hardware within the content distribution network 100 (e.g., a content delivery server 408), or using designated hardware and software resources within a shared content management server 102. The content delivery system 408 may receive content resources from the content customization system 402 and/or from the user management system 404, and provide the resources to user devices 106. The content delivery system 408 may determine the appropriate presentation format for the content resources based on the user characteristics and preferences, and/or the device capabilities of user devices 106. If needed, the content delivery system 408 may convert the content resources to the appropriate presentation format and/or compress the content before transmission. In some embodiments, the content delivery system 408 may also determine the appropriate transmission media and communication protocols for transmission of the content resources.

In some embodiments, the content delivery system 408 may include specialized security and integration hardware 410, along with corresponding software components to implement the appropriate security features content transmission and storage, to provide the supported network and client access models, and to support the performance and scalability requirements of the network 100. The security and integration layer 410 may include some or all of the security and integration components 208 discussed above in FIG. 2, and may control the transmission of content resources and other data, as well as the receipt of requests and content interactions, to and from the user devices 106, supervisor devices 110, administrative servers 116, and other devices in the network 100.

Figure 5:
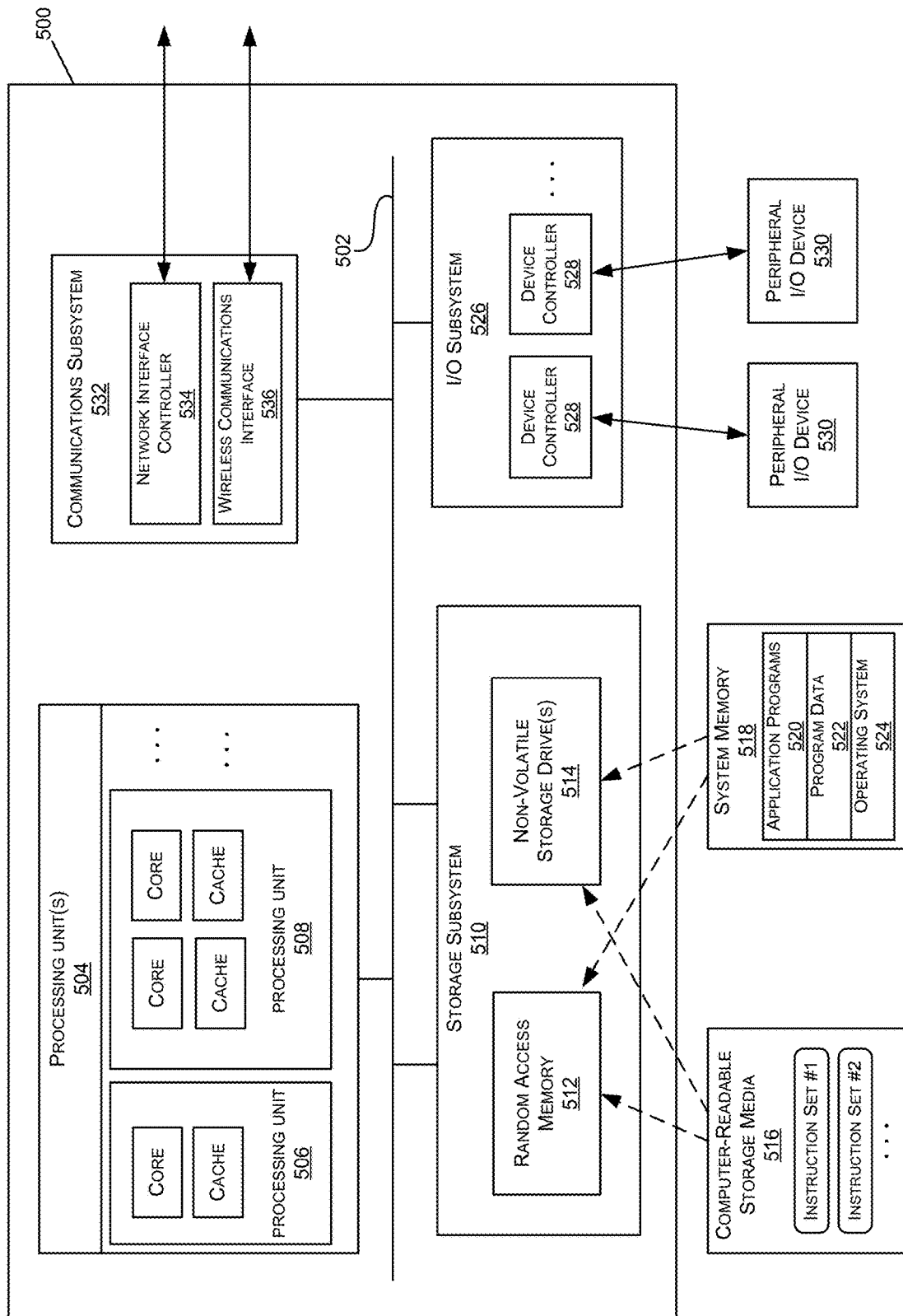
FIG. 5 is a block diagram illustrating the physical and logical components of a special-purpose computer device within a content distribution network.

With reference now to FIG. 5, a block diagram of an illustrative computer system is shown. The system 500 may correspond to any of the computing devices or servers of the content distribution network 100 described above, or any other computing devices described herein. In this example, computer system 500 includes processing units 504 that communicate with a number of peripheral subsystems via a bus subsystem 502. These peripheral subsystems include, for example, a storage subsystem 510, an I/O subsystem 526, and a communications subsystem 532.

Bus subsystem 502 provides a mechanism for letting the various components and subsystems of computer system 500 communicate with each other as intended. Although bus subsystem 502 is shown schematically as a single bus, alternative embodiments of the bus subsystem may utilize multiple buses. Bus subsystem 502 may be any of several types of bus structures including a memory bus or memory controller, a peripheral bus, and a local bus using any of a variety of bus architectures. Such architectures may include, for example, an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 504, which may be implemented as one or more integrated circuits (e.g., a conventional microprocessor or microcontroller), controls the operation of computer system 500. One or more processors, including single core and/or multicore processors, may be included in processing unit 504. As shown in the figure, processing unit 504 may be implemented as one or more independent processing units 506 and/or 508 with single or multicore processors and processor caches included in each processing unit. In other embodiments, processing unit 504 may also be implemented as a quad-core processing unit or larger multicore designs (e.g., hexa-core processors, octo-core processors, ten-core processors, or greater.

Processing unit 504 may execute a variety of software processes embodied in program code, and may maintain multiple concurrently executing programs or processes. At any given time, some or all of the program code to be executed can be resident in processor(s) 504 and/or in storage subsystem 510. In some embodiments, computer system 500 may include one or more specialized processors, such as digital signal processors (DSPs), outboard processors, graphics processors, application-specific processors, and/or the like.

I/O subsystem 526 may include device controllers 528 for one or more user interface input devices and/or user interface output devices 530. User interface input and output devices 530 may be integral with the computer system 500 (e.g., integrated audio/video systems, and/or touchscreen displays), or may be separate peripheral devices which are attachable/detachable from the computer system 500.

Input devices 530 may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. Input devices 530 may also include three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additional input devices 530 may include, for example, motion sensing and/or gesture recognition devices that enable users to control and interact with an input device through a natural user interface using gestures and spoken commands, eye gesture recognition devices that detect eye activity from users and transform the eye gestures as input into an input device, voice recognition sensing devices that enable users to interact with voice recognition systems through voice commands, medical imaging input devices, MIDI keyboards, digital musical instruments, and the like.

Output devices 530 may include one or more display subsystems, indicator lights, or non-visual displays such as audio output devices, etc. Display subsystems may include, for example, cathode ray tube (CRT) displays, flat-panel devices, such as those using a liquid crystal display (LCD) or plasma display, light-emitting diode (LED) displays, projection devices, touch screens, and the like. In general, use of the term "output device" is intended to include all possible types of devices and mechanisms for outputting information from computer system 500 to a user or other computer. For example, output devices 530 may include, without limitation, a variety of display devices that visually convey text, graphics and audio/video information such as monitors, printers, speakers, headphones, automotive navigation systems, plotters, voice output devices, and modems.

Computer system 500 may comprise one or more storage subsystems 510, comprising hardware and software components used for storing data and program instructions, such as system memory 518 and computer-readable storage media 516. The system memory 518 and/or computer-readable storage media 516 may store program instructions that are loadable and executable on processing units 504, as well as data generated during the execution of these programs.

Depending on the configuration and type of computer system 500, system memory 318 may be stored in volatile memory (such as random access memory (RAM) 512) and/or in non-volatile storage drives 514 (such as read-only memory (ROM), flash memory, etc.) The RAM 512 may contain data and/or program modules that are immediately accessible to and/or presently being operated and executed by processing units 504. In some implementations, system memory 518 may include multiple different types of memory, such as static random access memory (SRAM) or dynamic random access memory (DRAM). In some implementations, a basic input/output system (BIOS), containing the basic routines that help to transfer information between elements within computer system 500, such as during start-up, may typically be stored in the non-volatile storage drives 514. By way of example, and not limitation, system memory 518 may include application programs 520, such as client applications, Web browsers, mid-tier applications, server applications, etc., program data 522, and an operating system 524.

Storage subsystem 510 also may provide one or more tangible computer-readable storage media 516 for storing the basic programming and data constructs that provide the functionality of some embodiments. Software (programs, code modules, instructions) that when executed by a processor provide the functionality described herein may be stored in storage subsystem 510. These software modules or instructions may be executed by processing units 504. Storage subsystem 510 may also provide a repository for storing data used in accordance with the present invention.

Storage subsystem 300 may also include a computer-readable storage media reader that can further be connected to computer-readable storage media 516. Together and, optionally, in combination with system memory 518, computer-readable storage media 516 may comprehensively represent remote, local, fixed, and/or removable storage devices plus storage media for temporarily and/or more permanently containing, storing, transmitting, and retrieving computer-readable information.

Computer-readable storage media 516 containing program code, or portions of program code, may include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computer system 500.

By way of example, computer-readable storage media 516 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 516 may include, but is not limited to, Zip® drives, flash memory cards, universal serial bus (USB) flash drives, secure digital (SD) cards, DVD disks, digital video tape, and the like. Computer-readable storage media 516 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 500.

Communications subsystem 532 may provide a communication interface from computer system 500 and external computing devices via one or more communication networks, including local area networks (LANs), wide area networks (WANs) (e.g., the Internet), and various wireless telecommunications networks. As illustrated in FIG. 5, the communications subsystem 532 may include, for example, one or more network interface controllers (NICs) 534, such as Ethernet cards, Asynchronous Transfer Mode NICs, Token Ring NICs, and the like, as well as one or more wireless communications interfaces 536, such as wireless network interface controllers (WNICs), wireless network adapters, and the like. Additionally and/or alternatively, the communications subsystem 532 may include one or more modems (telephone, satellite, cable, ISDN), synchronous or asynchronous digital subscriber line (DSL) units, FireWire® interfaces, USB® interfaces, and the like. Communications subsystem 536 also may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components.

The various physical components of the communications subsystem 532 may be detachable components coupled to the computer system 500 via a computer network, a FireWire® bus, or the like, and/or may be physically integrated onto a motherboard of the computer system 500.

Communications subsystem 532 also may be implemented in whole or in part by software.

In some embodiments, communications subsystem 532 may also receive input communication in the form of structured and/or unstructured data feeds, event streams, event updates, and the like, on behalf of one or more users who may use or access computer system 500. For example, communications subsystem 532 may be configured to receive data feeds in real-time from users of social networks and/or other communication services, web feeds such as Rich Site Summary (RSS) feeds, and/or real-time updates from one or more third party information sources (e.g., data aggregators 309). Additionally, communications subsystem 532 may be configured to receive data in the form of continuous data streams, which may include event streams of real-time events and/or event updates (e.g., sensor data applications, financial tickers, network performance measuring tools, clickstream analysis tools, automobile traffic monitoring, etc.). Communications subsystem 532 may output such structured and/or unstructured data feeds, event streams, event updates, and the like to one or more data stores 104 that may be in communication with one or more streaming data source computers coupled to computer system 500.

Due to the ever-changing nature of computers and networks, the description of computer system 500 depicted in the figure is intended only as a specific example. Many other configurations having more or fewer components than the system depicted in the figure are possible. For example, customized hardware might also be used and/or particular elements might be implemented in hardware, firmware, software, or a combination. Further, connection to other computing devices, such as network input/output devices, may be employed. Based on the disclosure and teachings provided herein, a person of ordinary skill in the art will appreciate other ways and/or methods to implement the various embodiments.

Figure 6:
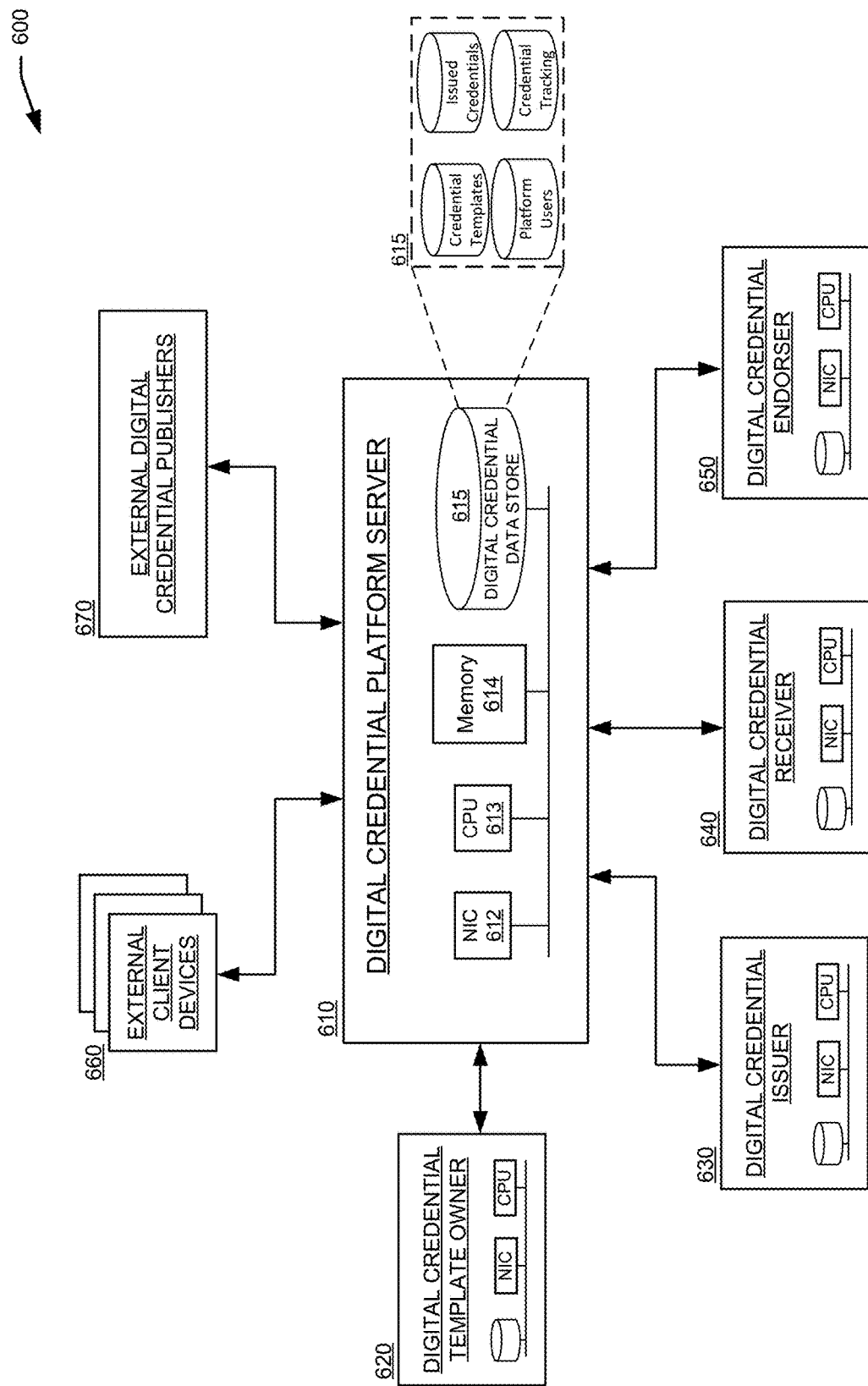
FIG. 6 is a block diagram illustrating an example system for generating, managing, and tracking digital credential templates and digital credentials, according to one or more embodiments of the disclosure.

With reference now to FIG. 6, a block diagram is shown illustrating an example of a digital credential management system 600 for generating, managing, and tracking digital credential templates and digital credentials. As shown in this example, a digital credential management system 600 may include a digital credential platform server 610 configured to communicate with various other digital credential systems 620-680. As discussed below, the digital credential platform server 610 may receive and store digital credential templates from various digital credential template owner systems 620. Systems 620 may correspond to the computer servers and/or devices of educational institutions or professional training organizations, which may have the primary responsibility for defining a digital credential template and controlling the content and requirements for users to receive a digital credential from the organization. The digital credential management system 600 may include one or more digital credential issuer systems 630. As discussed below, each issuer system 630 may communicate with the platform server to request and receive access to issue digital credentials based on specific digital credential templates. The platform server 610 may process template access requests from the credential issuer systems 630, permitting or denying a specific system 630 to generate (or issue) a digital credential based on a specific digital credential template.

As used herein, a digital credential template (or digital badge template) may refer to an electronic document or data structure storing a general (e.g., non-user specific) template or description of a specific type of digital credential that may be issued to an individual. Digital credential templates may include, for example, a description of the skills, proficiencies, and/or achievements that the digital credential represents. This description may take the form of diploma data, certification data, and/or license data, including the parent organization (i.e., the digital credential template owner) responsible for creating and defining the digital credential template. Examples of digital credential templates may include templates for various technology certifications, licensure exams, professional tests, training course completion certificates, and the like. In contrast to a digital credential template, a digital credential (or digital badge) may refer to an instance of an electronic document or data structure, generated for a specific individual (i.e., the credential receiver), and based on a digital credential template. Thus, a digital credential document or data structure may be based on a corresponding digital credential template, but may be customized and populated with user-specific information such as individual identification data (e.g., name, email address, and other user identifiers), credential issuance data (e.g., issue date, geographic location of issuance, authorized issuer of the credential, etc.), and links or embedded data that contain the specific user's supporting documentation or evidence relating to the credential.

As shown in this example, the system 600 also may include a digital credential receiver system 640 and a digital credential endorser system 650. The digital credential receiver system 640 may be a computing device associated with a credential receiver (or credential earner), for example, an individual user of an electronic learning system, professional training system, online certification course, etc. In some embodiments, credential receivers may access the platform server 610 via systems 640 to accept or reject newly issued digital credentials, review and update their own set of previously earned digital credentials, as well as to publish (or share) their digital credentials via communication applications or publishing platforms such as social media systems. Digital credential endorser system 650 may be a computing system associated with an endorsing entity, such as an educational institution, business, or technical organization that has chosen to review and endorse a specific digital credential template. The platform server 610 may receive and track the endorsements received from systems 650, and may associate the endorsements with the user-specific digital credentials issued based on the endorsed templates.

Additionally, the digital credential management system 600 in this example includes a number of external client devices 660 and external digital credential publishers 670. External client devices 660 may correspond to computing systems of third-party users that may interact with the platform server 610 to initiate various functionality or retrieve data relating to templates and/digital credentials managed by the platform 610. For example, a client device 660 may query the platform server 610 for data metrics and/or analyses relating to a subset of digital credentials stored in the digital credential data store 615. The third-party systems 660 also may provide data to the platform server 610 that may initiate updates to the templates and/digital credentials stored in the data store 615. External digital credential publishers 670 may correspond to third-party systems configured to receive digital credential data from the platform 610 and publish (or present) the digital credential data to users. Examples of publishers 670 may include social media web site and systems, digital badge wallets, and/or other specialized servers or applications configured to store and present views of digital badges to users.

In various embodiments described herein, the generation and management of digital credentials, as well as the tracking and reporting of digital credential data, may be performed within CDNs 100, such as eLearning, professional training, and certification systems 100. For example, within the context of an eLearning CDN 100, a content management server 102 or other CDN server (e.g., 104, 112, 114, or 116) may create and store digital credential templates to describe and define various proficiencies, achievements, or certifications supported by the eLearning CDN 100. Additionally or alternatively, the content management server 102 or other servers of an eLearning CDN 100 may issue digital credentials to users, based on its own digital certificate templates and/or templates received from other systems or CDNs. Further, in some implementations, an eLearning CDN 100 may be configured to include a digital credential platform server 610 to store and manage templates and digital credentials between separate systems within the CDN 100. Thus, in various different implementations, the content management server(s) 102 of a CDN 100 may incorporate one or more digital certificate template owner system(s) 620, digital certificate issuer system(s) 630, and/or digital certificate platform server(s) 610. In such embodiments, the various components and functionalities described herein for the platform server 610, owner system 620, and/or issuer system 630 all may be implemented within one or more content management servers 102 (and/or other servers) of an eLearning or professional training CDN 100. In other examples, a digital credential platform server 610 may be implemented using one or more computer servers, and other specialized hardware and software components, separately from any other CDN components such as content servers 112, content management servers 102, data store servers 104, and the like. In these examples, the digital credential platform server 610 may be configured to communicate directly with related systems 620-670, or indirectly through content management servers 102 and/or other components and communications networks of the CDN 100.

In order to perform these features and other functionality described herein, each of the components and sub-components discussed in the example digital credential management system 600 may correspond to a single computer server or a complex computing system including a combination of computing devices, storage devices, network components, etc. Each of these components and their respective subcomponents may be implemented in hardware, software, or a combination thereof. Certain systems 620-670 may communicate directly with the platform server 610, while other systems 620-670 may communicate with the platform server 610 indirectly via one or more intermediary network components (e.g., routers, gateways, firewalls, etc.) or other devices (e.g., content management servers 102, content servers 112, etc.). Although the different communication networks and physical network components have not been shown in this example so as not to obscure the other elements depicted in the figure, it should be understood that any of the network hardware components and network architecture designs may be implemented in various embodiments to support communication between the systems, servers, and devices in the digital credential management system 600. Additionally, different systems 620-670 may use different networks and networks types to communicate with the platform server 610, including one or more telecommunications networks, cable networks, satellite networks, cellular networks and other wireless networks, and computer-based IP networks, and the like. Further, certain components within the digital credential management system 600 may include special purpose hardware devices and/or special purpose software, such as those included in I/O subsystem 611 and memory 614 of the platform server 610, as well as those within the memory of the other systems 620-670, and the digital credential data store 615 maintained by the platform server 610, discussed below.

Although the various interactions between the platform server 610 and other systems 620-670 may be described below in terms of a client-server model, it should be understood that other computing environments and various combinations of servers and devices may be used to perform the functionality described herein in other embodiments. For instance, although the requests/responses to determine the authorized issuers 630 for specific digital credential templates, the generation of digital credentials, and the retrieval and presentation of digital credential tracking and reporting data, may be performed by a centralized web-based platform server 610 in collaboration with various client applications at the other systems 620-670 (e.g., web browser applications or standalone client software), in other cases these techniques may be performed entirely by a specialized digital credential platform server 610, or entirely by one or more digital credential tools (e.g., software services) executing on any one of the systems 620-670. In other examples, a client-server model may be used as shown in system 600, but different functional components and processing tasks may be allocated to the client-side or the sever-side in different embodiments. Additionally, the digital credential data store 615 may be implemented as separate servers or storage systems in some cases, and may use independent hardware and software service components. However, in other implementations, some or all of the digital credential data store 615 may be incorporated into the platform server 610 (as shown in this example) and/or may be incorporated into various other systems 620-670.

In some embodiments, each of the systems 620-670 that collaborate and communicate with the platform server 610 may be implemented as client computing systems, such desktop or laptop computers, smartphones, tablet computers, and other various types of computing devices, each of which may include some or all of the hardware, software, and networking components discussed above. Specifically, any of client systems 620-670 may be implemented using any computing device with sufficient processing components, memory and software components, and I/O system components for interacting with users and supporting the desired set of communications with the platform server 610, as described herein. Accordingly, client systems 620-670 may include the necessary hardware and software components to establish the network interfaces, security and authentication capabilities, and capabilities for transmitting/receiving digital credential templates and digital credentials, digital credential data requests/responses to the platform server 610, etc. Each client system 620-670 may include an I/O subsystem, network interface controller, a processing unit, and memory configured to operate client software applications. The digital credential platform server 610 may be configured to receive and execute various programmatic and graphical interfaces for generating, managing, and tracking issued digital credentials, in collaboration with the various client systems 620-670. Accordingly, each client system 620-670 may include an I/O subsystem 611 having hardware and software components to support a specific set of output capabilities (e.g., LCD display screen characteristics, screen size, color display, video driver, speakers, audio driver, graphics processor and drivers, etc.), and a specific set of input capabilities (e.g., keyboard, mouse, touchscreen, voice control, cameras, facial recognition, gesture recognition, etc.). Different client systems 620-670 may support different input and output capabilities within their I/O subsystems, and thus different types of user interactions, and platform server 610 functionality may be compatible or incompatible with certain client systems 620-670. For example, certain types of digital credential generation and search functionality may require specific types of processors, graphics components, network components, or I/O components in order to be optimally designed and constructed using a client system 620-670.

In some embodiments, the digital credential platform server 610 may generate and provide software interfaces (e.g., via a web-based application, or using other programmatic or graphical interface techniques) used by the various client systems 620-670 to perform the various digital credential management functionality described herein. In response to receiving inputs from a client system 620-670 corresponding to digital credentials, templates, credential search requests and criteria, etc., the platform server 610 may access the underlying digital credential data store 615 to perform the various functionality described herein. In other to perform the tasks described herein, platform server 610 may include components such as network interface controllers 612, processing units 613, and memory 614 configured to store server software, handle authentication and security, and to store, analyze, and manage the digital credentials, templates, and credential tracking data stored within the digital credential data store 615. As shown in this example, the digital credential data store 615 may be implemented as separate dedicated data stores (e.g., databases, file-based storage, etc.) used for storing digital credential template objects, issued digital credentials, credential tracking data, and authorized user/role data. The platform server 610 and data store 615 may be implemented as separate software (and/or storage) components within a single computer server 610 in some examples, while in other examples may be implemented as separate computer servers/systems having separate dedicated processing units, storage devices, and/or network components.

Figure 7:
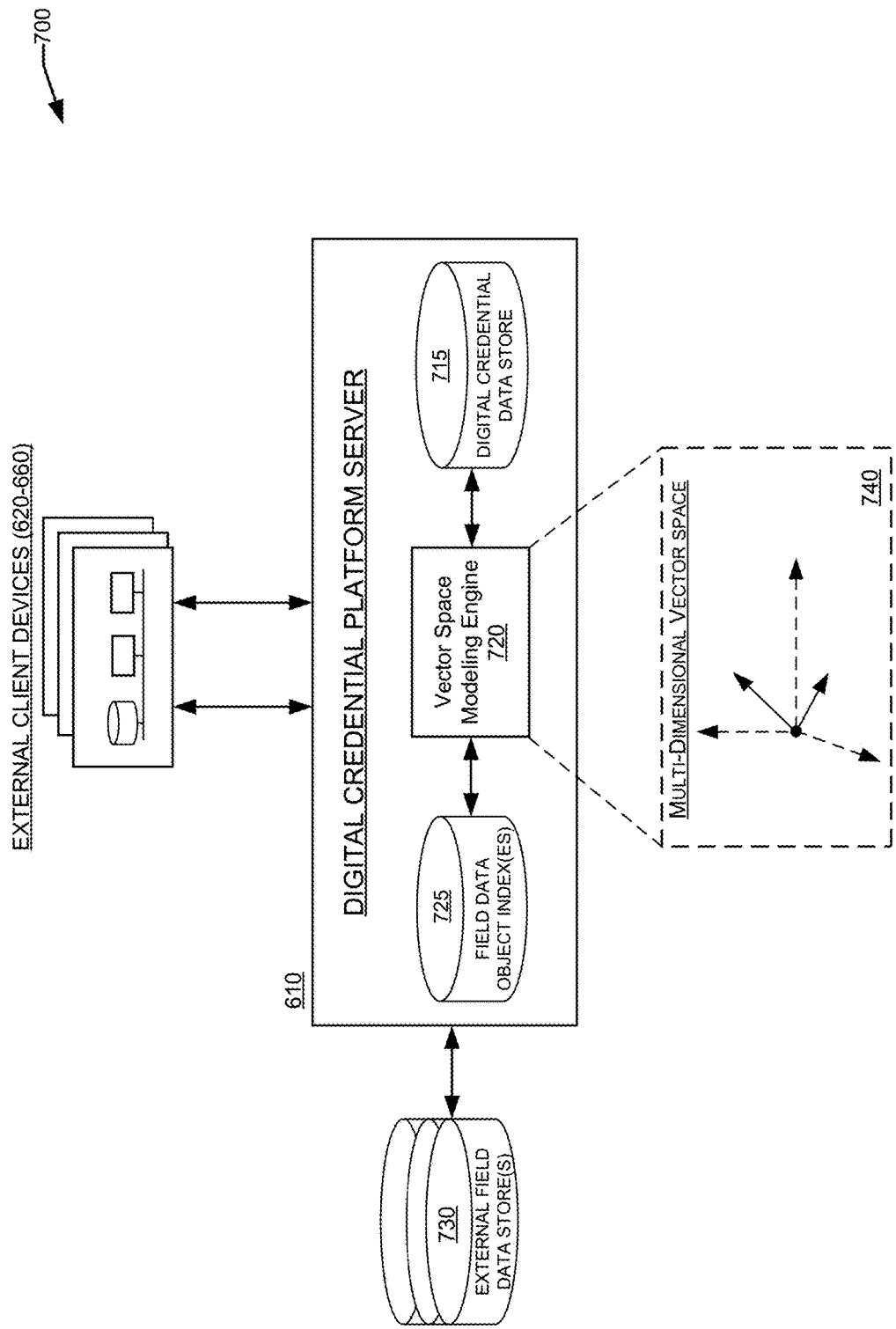
FIG. 7 is another block diagram illustrating an example system for mapping using vector space modeling between digital credential data and field data objects, according to one or more embodiments of the disclosure.

Referring now to FIG. 7, a block diagram is shown illustrating an example of digital credential mapping system 700. As described below, in this example, the components of digital credential mapping system 700 may be configured to analyze and generate mappings between digital credentials stored in a digital credential data store 715, and field data objects stored in one or more field data object indexes 725. In addition to generating field-credential mappings, system 700 may be configured to receive and respond to requests from various client devices 620-660. For example, as discussed in more detail below, a client device 620-660 may transmit a request to a digital credential platform server 610 identifying one or more digital credentials, and may receive back from platform server 610 data identifying one or more fields that correspond to the digital credentials. Conversely, a client device 620-660 may transmit a request to the platform server 610 identifying one or more fields, and may receive back from platform server 610 data identifying the digital credentials that correspond to the fields identified in the request.

In some examples, a digital credential mapping system 700 may be implemented within the same system 600 described above in FIG. 6. That is, the same digital credential platform server 610 may be used to perform to the generation, management, and tracking of digital credentials and templates discussed above, as well as the mapping of digital credentials to field data objects as shown in this example. Thus, the digital credential data store 715 also may correspond to data store 615, and external client devices 620 may correspond to the same system components 620-660 described above. However, in other examples, digital credential mapping system 700 may be implemented entirely separately from any digital credential management system 600. For instance, in some embodiments, system 700 need not include any digital credential data store 715 or functionality for issuing, storing, managing, or tracking credentials, but instead might only access and retrieve digital credential data from external data sources (e.g., a remote digital credential management system 600).

As described below in more detail, various client devices may request data corresponding to mappings between digital credential templates (or specific instances of digital credentials) and field data objects. Examples of potential client devices that may request a set of fields based on credentials (or vice versa) may include digital credential owners 620, digital credential issuers 630, digital credential receivers 640, digital credential endorsers 650, and/or other external client devices 660. In some embodiments, the system 700 may support different interfaces (e.g., web-based graphical interfaces, web services, and/or APIs) based on the type/role of the particular client device. For instance, certain types of client devices may be authorized to provide user identifiers or digital credential identifiers and retrieve corresponding field mappings but might not be permitted to request digital credentials based on fields, whereas other types of client devices may have the opposite authorizations. Additionally, as discussed below, some embodiments may involve multiple digital credential data stores 715 and/or multiple field indexes 725. In such embodiments, security and permissioning systems may be used to govern which corresponding field indexes 725 and/or digital credential stores 715 are used for serving requests from particular clients. For instance, a first client 620 may be authorized to retrieve mappings from one portion of a field data object index 725 corresponding to a first external field database 730a, but not from other portions of the index 725 that correspond to other external field databases 730b.

Further, depending on the type/role of a particular client 620-660, the platform server 610 may accept different data within a request (e.g., a credential owner ID for a credential owner client 620, a credential issuer ID for credential issuer client 630, a credential recipient ID for a credential receiver client 640, or a set of digital credential template IDs from any external client, etc.), and/or may return different data fields and formats in the response to the client device 620-660.

Additionally, certain clients 620-660 may have ownership or administrative control over certain digital credential templates and/or issued digital credential stored in the data store 715. For example, a particular template owner 620 may control the use of its own digital credential templates within the store 615 but not other templates within the store 615. Similar permissions may be assigned to credential issuers 630, receivers 640, and/or endorsers 650 in various embodiments. In such examples, the platform server 610 may provide functionality to allow clients 620-660 having ownership or administrative control over particular digital credentials (e.g., a template or issued credential) to control whether or not those digital credentials available to be used in the queries/requests initiated by other users. For instance, a particular template owner 620 may specify, via the platform server 610, which of its digital credential templates can be used by other users to search for corresponding fields, and also may specify which of its digital credential templates may be returned in response to request searching for corresponding digital credentials (based on field data objects provided as input).

In some embodiments, the field data objects stored in index 725 may correspond to fields of work, such as types or classes of occupations. For example, external field data stores(s) 730 may include occupation databases such as the O*NET® database, or another occupation data store containing variables that describe work and/or worker characteristics. Data stores 730 may store, for instance, skill requirements, education and training requirements, worker abilities and characteristics, and/or related technologies for a large taxonomy of occupations. As discussed below in more detail, the digital credential platform server 610 may be configured to access and retrieve specific field data (e.g., occupation characteristics, skills, abilities, technologies, education and training requirements, etc.) from the external data stores 730, and to store that data within one or more local data structures such as field data object indexes 725. In some embodiments, to increase the speed in which mappings may be generated between digital credentials and fields, the platform server 610 may tokenize, preprocess, and import (e.g., vectorize), and index the field data in advance of receiving any requests from a client device 620-660. However, in other examples, in the platform server 610 may rely entirely on external field data stores 730, and need not import or preprocess the field/occupation data into any local storage structures 725. Thus, field data object indexes 725 may be optional in certain implementations.

While certain embodiments may include retrieving/extracting field/occupation/job data from a single external data store 730, in other embodiments the platform server 610 may access multiple different external data stores 730 containing different sets of field/occupation/job data. In some cases, the platform server 610 may aggregate field data across multiple different occupation data stores 730. For instance, the platform server 610 may access multiple occupation data stores 730 (e.g., O*NET® database, Bureau of Labor Statistics (BLS) governmental databases, etc.) and may aggregate the different data fields (e.g., skills, abilities, technologies, education and training requirements, etc.) across the different data stores 730 into single fields within the index 725. In other cases, data from different external data stores 730 need not be aggregated, but may be stored separately and used to serve different requests. For example, different occupation data stores 730 may be associated with different geographic region (e.g., states, countries, etc.), so that requests received from a client 620-660 in a particular geographic region will be served by the index 725 using only the data from the store 730 of the same geographic region.

The vector space modeling engine 720, as shown in this example, may retrieve digital credential data from the digital credential data store 715, retrieve field/occupation data from the field data object indexes 725, and transform both the digital credential data and the field/occupation data into vectors within the same multi-dimensional vector space 740. The vector space modeling engine 720 then may calculate the distances between the various digital credential vector(s) and the field/occupation vector(s) in order to determine mappings between the corresponding digital credentials and field/occupations. For instance, specific fields/occupations may be represented in the vector space 740, derived from the statistical distribution of different data fields (e.g., characteristics, abilities, technologies, education and training requirements, etc.) across the entire field/occupation index 725. Specific digital credentials (or sets of digital credentials), based on requests from clients 620-660, also may be represented by vectors in vector space 740 and compared with the vectors representing the various fields/occupations. The techniques and algorithms used by the vector space modeling engine 720 to generate mappings between digital credentials and fields/occupations are discussed in more detail below.

As shown in this example, the vector space modeling engine 720 may be implemented as a processing component within the platform server 610. However, in other examples, the vector space modeling engine 720 may be implemented separately from the platform server 610 and may operate as an independent system with direct access to one or more digital credential data stores 715 and one or more field data object indexes 725. Additionally, although the vector space modeling engine 720 and field/occupation data indexes 725 are shown separately in this example, they may be implemented as a single data storage/processing engine in some embodiments. For example, data storage index 725 may be a high-speed index storage platform that includes indexing and searching capabilities, as well as advanced tokenization and data analysis. Further data storage index 725 may support various different search query types (e.g., phrase search queries, proximity queries, range queries, fuzzy searches, wildcard searches, etc.), and may support various ranking functions using Boolean term matching, vector space modeling, and/or other probabilistic ranking functions. In these cases, the field data object index 725 may include the vector space modeling engine 720 as an integrated component of the high-speed storage platform 725. Examples of such combined indexes 725 and modeling engines 720 may be implemented on platforms such as APACHE LUCENE CORE®, among others.

Figure 8:
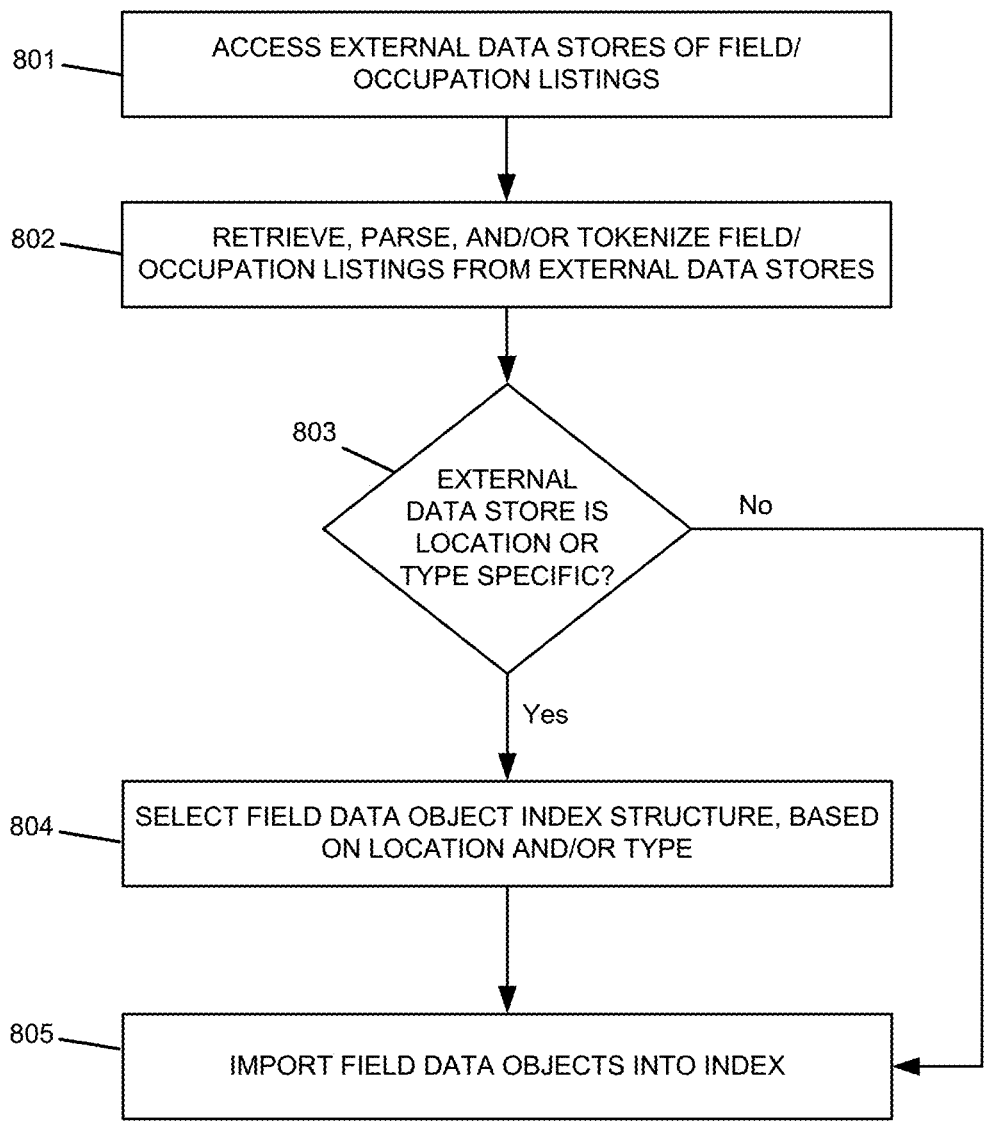
FIG. 8 is a flow diagram illustrating an example process of retrieving and importing data from one or more external field/occupation databases into a local data structure for vector space modeling, according to one or more embodiments of the disclosure.

Referring now to FIG. 8, a flow diagram is shown illustrating a process of retrieving and importing data from one or more external field/occupation databases 730 into a local storage structure 725. As described below, the steps in this process may be performed by one or more components in the digital credential mapping system 700 described above. For example, each of steps 801-805 may be performed by the digital credential platform server 610 (and/or vector space modeling engine 720), in communication with one or more external field data stores 730. However, it should be understood that the various features and processes described herein, including identifying and accessing external field/occupation data stores 730, and parsing, tokenizing and transforming the field data, need not be limited to the specific systems and hardware implementations described above in FIGS. 1-7, but also may be performed on the various other systems and hardware implementations described herein.

In step 801, the digital credential platform server 610 may identify and access one or more different external data stores 730 containing field/occupation data. As noted above, data stores 730 may include, for example, one or more O*NET® databases, one or more Bureau of Labor Statistics (BLS) governmental databases, and/or other various field/occupation data stores. In certain embodiments, databases of job listings may be specifically excluded from the accessed data stores 730, because job field or occupation data stores may use standard and uniform terminology, whereas job listing databases might not. However, in other embodiments, the platform server 610 also may access and retrieve data from job listing databases, and may use algorithms to classify and group individual job listings into the appropriate occupations/fields. Such algorithms may include mapping job listings having different titles, descriptions, and characteristic to the same field/occupation based on subject matter analysis and generation/matching of synonyms for keywords within the job listings.

As noted above, the platform server 610 may import data from a single external field/occupation data store 730, or from multiple data stores 730, in various embodiments. For example, field/occupation data from different data stores 730 may be aggregated into a single uniform occupation taxonomy within the index structure 725. In other examples, field/occupation data may be imported into separate data structures 725 (or separate portions of a single data structure 725), and used to serve different mapping requests. Thus, step 801 may include accessing different external field/occupation listings corresponding to different geographic regions (e.g., states, countries, etc.), or databases storing different field/occupation types (e.g., different language qualifications, different industries, different minimum education levels or qualifications, etc.), and the field/occupation data from each different external data store 730 may be imported/stored separately.

In step 802, a plurality of individual field/occupation listings from the external data stores 730 may be retrieved, parsed, and/or tokenized by the platform server 610. In some embodiments, external data stores 730 may be publically accessible web-based data stores, and each field/occupation listing may correspond to a specially formatted web document. Platform server 610 may search/crawl through a web-based directory to retrieve a number of HTML files, XML files, JS files, or the like, where each file represents a single field/occupation in the taxonomy. For example, referring briefly to FIG. 9, an example occupation listing web document 900 is shown from an O*NET database corresponding to the "Auditor" field (or occupation). In this example, document 900 may be formatted in accordance with a known O*NET document format, including separate data fields at predetermined locations within the document 900 that display the title 901 of the field/occupation, a description 902 of the field/occupation, a set of tasks 903 associated with the field/occupation, a set of related tools and technologies 904 associated with the field/occupation, and several additional data fields accessible via tabs and links 905 to provide additional data relating to the field/occupation.

The algorithms and other techniques used in step 802 may retrieve a plurality of web documents such as the example O*NET document 900 (or any other field/occupation listings), and then may extract and parse data from these documents or listings, and tokenize and preprocess the data for storing within one or more index structures 725. For each field/occupation document or listing retrieved, the platform server 610 may initially identify and separately extract each of a particular relevant data fields from the document. For instance, using the example O*NET document 900, the platform server 610 may separately extract the title field 901, description field 902, task field 903, tools/technologies field 904, etc., so that each of these fields may be analyzed and processed separately using custom processes for that particular data field. In some embodiments, certain data fields (e.g., the description 902 and/or tasks 903) may be parsed by the platform server 610 to extract out specific individual keywords from those data fields, and each individual keyword may be submitted to one or more processes for stemming, preprocessing, and/or identifying synonyms or substitute related terms. For example, referring to the description 902 of the example document 900, the term "Examine" may be stemmed to the root "examin" in order to match the terms "examined," "examiner," "examining," etc. As another example, "management" may be stemmed to "manag," so as to include the related terms "manage," "manager," etc. Additional stemming/preprocessing steps for terms found in the example document 900 may include formatting processes such as removing apostrophes, converting to lower case, standardizing any spacing or numbers within the term, etc. Further, the stemmed and preprocessed term (and/or the related derivative terms) may be used to determine synonyms or other related terms (e.g., "inspect," "evaluate," "review," etc.). Moving on to the second word in the description 902 ("and"), the platform server 610 may discard this word, along with any other stock words, connector words, and other words determined to be irrelevant to the digital credential mapping. The platform server 610 then may move on to perform the same processes of stemming, preprocessing, and generating related terms on the third word "analyze" and the fourth word "accounting," and so on.

In some cases, the platform server 610 may be configured to detect multi-word keywords within a data field, rather than single word keywords. For example, when parsing the tools field 903 of the field/occupation document 900, the platform server 610 may determine that the term "Laser fax machine" should be stored as a single multi-word term, rather than as separate terms "laser," "fax," and "machine." In some embodiments, the platform server 610 may first identify any known and/or common multi-words terms found within a field (e.g., "financial analyst," "desktop computer," "compliance software," etc.), and then may process any remaining terms from the field as single-word terms. Additionally, the platform server 610 may be configured in some embodiments to identify and process multi-words terms only in certain fields (e.g., tasks 903, tools/technologies 904), but not in other fields (e.g., description 902).

Continuing with the retrieving/importing process of FIG. 8, in step 803 the platform server 610 may determine whether or not the field/occupation document(s) or listing(s) retrieved in step 802 are to be stored in a particular index data structure 725 or other data store. As noted above, in some cases, the platform server 610 may access multiple different field/occupation data stores 730 which may be stored separately and used to serve different requests. In such cases, for example, if the field/occupation listings retrieved in step 802 are specific to a particular geographic region, industry, education level, etc., (803:Yes), then in step 804 the platform server may determine the appropriate index structure 725 (and/or the particular section or portion of the structure 725) into which the correspond field/occupation data object is to be stored. Thus, for example, different data structures 725 may be used to receive field/occupation listing from different O*NET databases 730 corresponding to different country listings, or different industry listings, etc. As discussed below, these different data structures 725 (or different sections/portions of a shared data structure 725) may be transformed into different multi-dimension vector spaces and may be used to serve requests from different clients 620-660.

In other cases, the field/occupation listing data from one or more data stores 730 may be used to populate the same index 725 (803:No), in which case step 804 may be skipped and the data from all external field data stores 730 may be aggregated into a single index 725 (and transformed into single multi-dimension vector space). Then, in step 805, the field/occupation listing data from retrieved and processed in step 802 may be imported into a corresponding data object within a field/occupation index data structure 725. In some embodiments, during the importation in step 805, the field/occupation documents or listings may be stored as data objects which can be represented (e.g., using a vector space modeling engine 720) as vectors within a multi-dimensional vector space. For example, each unique term in a field/occupation document or listing, following the preprocessing and tokenization steps, may correspond to a different dimension in a multi-dimensional vector space. Each field/occupation document or listing retrieved in step 802 may be a linear combination of vectors along the axes. For example, a single document 900 (or any other listing data for a field/occupation) may be converted (or "vectorized") into field data object having multiple text fields based on the different types of data fields extracted from the document or listing (e.g., occupation title, description keywords, skills keywords, tools/technologies keywords, etc.). The list of keywords stored for a field data object in index 725 may include all of the stemmed keywords determined in step 802, including processed synonyms and related words. The representation of the field data objects as vectors in the index 725 may include a value for each dimension, where the dimension corresponds to a unique word/term/phrase within the document and the value identifies the number of instances of the word/term/phrase within the document. These values within the vector representations indicate when certain terms (e.g., "audit," "software," "analytics," etc.) appear multiple times within the document 900 (or other field/occupation listing) upon which the vector field data object is based.

Figure 10A:
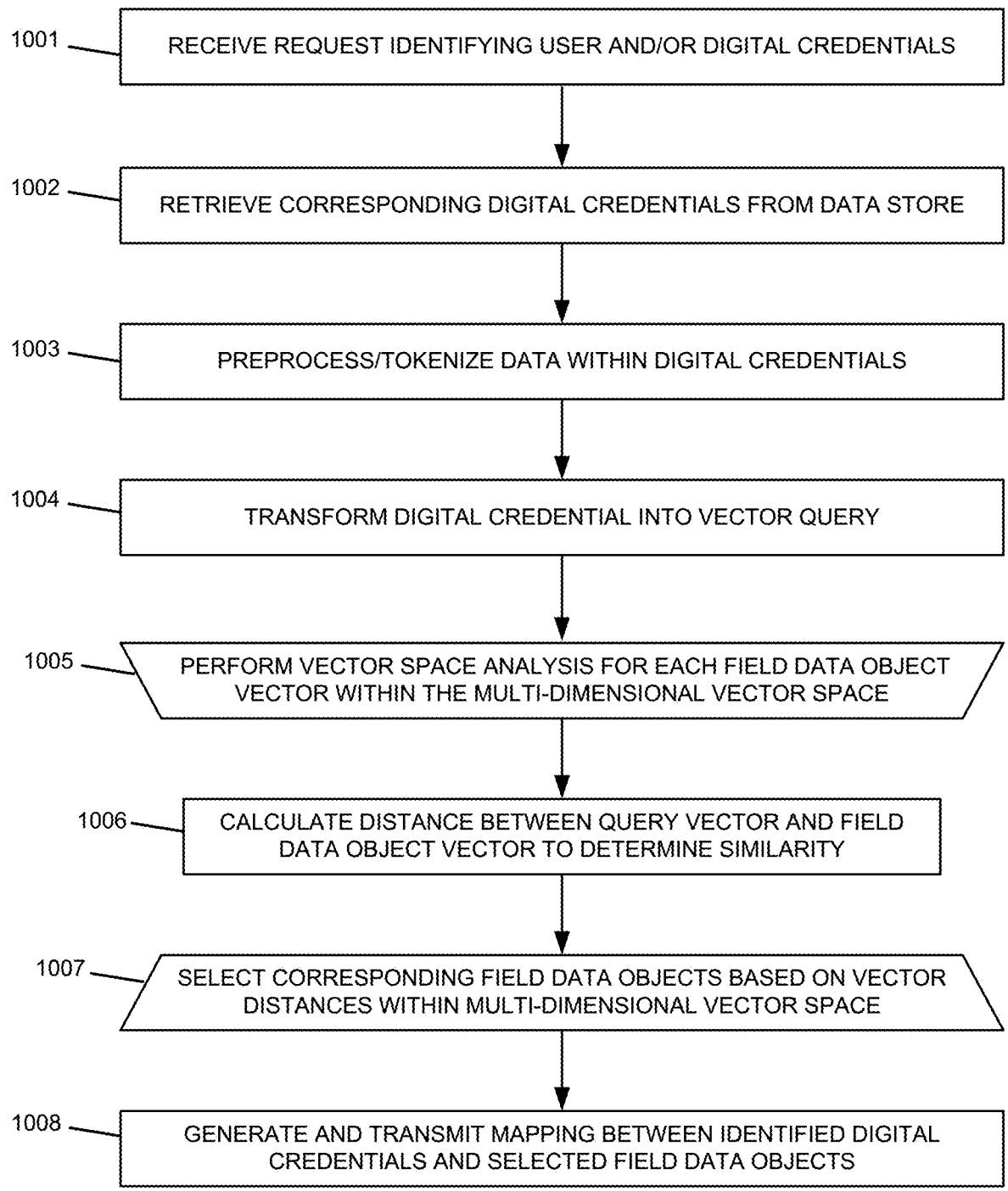
FIG. 10A is a flow diagram illustrating an example process of determining and retrieving mappings between digital credentials and corresponding field data, according to one or more embodiments of the disclosure.

Referring now to FIG. 10A, a flow diagram is shown illustrating a process of determining and retrieving mappings between digital credentials and corresponding fields/occupations, in response to requests from client devices. As described below, the steps in this process may be performed by one or more components in the digital credential mapping system 700 described above. For example, each of steps 1001-1008 may be performed by the digital credential platform server 610 (and/or vector space modeling engine 720), in communication with one or more client devices 620-660. However, it should be understood that the various features and processes described herein, including transforming digital credential data, and generating and submitting corresponding queries to multi-dimensional vector spaces to determine mappings to fields/occupations, need not be limited to the specific systems and hardware implementations described above in FIGS. 1-7, but also may be performed on the various other systems and hardware implementations described herein.

In step 1001, a request may be received from a client device 620-660 to retrieve field/occupation data associated with one or more digital credentials. In some embodiments, the request may identify one or more particular digital credentials stored in the digital credential data store 715. As discussed below, a client may identify a single digital credential (or badge) to receive a set of fields/occupations most closely associated with the digital credential, or may identify multiple digital credentials to receive a set of fields/occupations most closely associated with the combination of digital credentials. The digital credentials may be identified in the request using credential IDs passed in with the request from the client device 620-660. In other embodiments, the request in step 1001 may include one or more user IDs (or entity IDs) instead of or in addition to digital credential IDs. For example, a request identifying (or received from) a particular digital credential owner 620 may correspond to a request for a set of fields/occupations most closely associated with digital credentials of that owner 620, while a request identifying (or received from) a particular digital credential receiver 640 may correspond to a request for a set of fields/occupations most closely associated with digital credentials issued to that receiver 640, and so on.

As noted above, the request in step 1001 may be received and processed by a digital credential platform server 610 including vector space modeling engine 720 digital credential data store 725 and/or field data object index 715. However, in other examples, the requests in step 1001 may be received and processed by a vector space modeling engine 720 operating separately and independently from any digital credential platform server 610.

In step 1002, the digital credentials identified in the request of step 1001 may be retrieved from the digital credential data store 715. For example, using the digital credential identifiers and/or user identifiers received in step 1001, the platform server 610 may retrieve the associated digital credentials from the data store 715. In different embodiments, the digital credentials retrieved in step 1002 may be credential templates (which are not specific to a receiver or provider of the credential), and/or issued credentials (which are specific to receiver or provider). In some embodiments, it may be preferable to retrieve and use issued credentials to determine mappings to field data objects, so that the additional data stored for issued credentials (e.g., provided by, issue date, expires on, issued to, endorsed by, etc.) may be factored into the determination of the most closely related fields/occupations to the digital credential.

Figure 11:
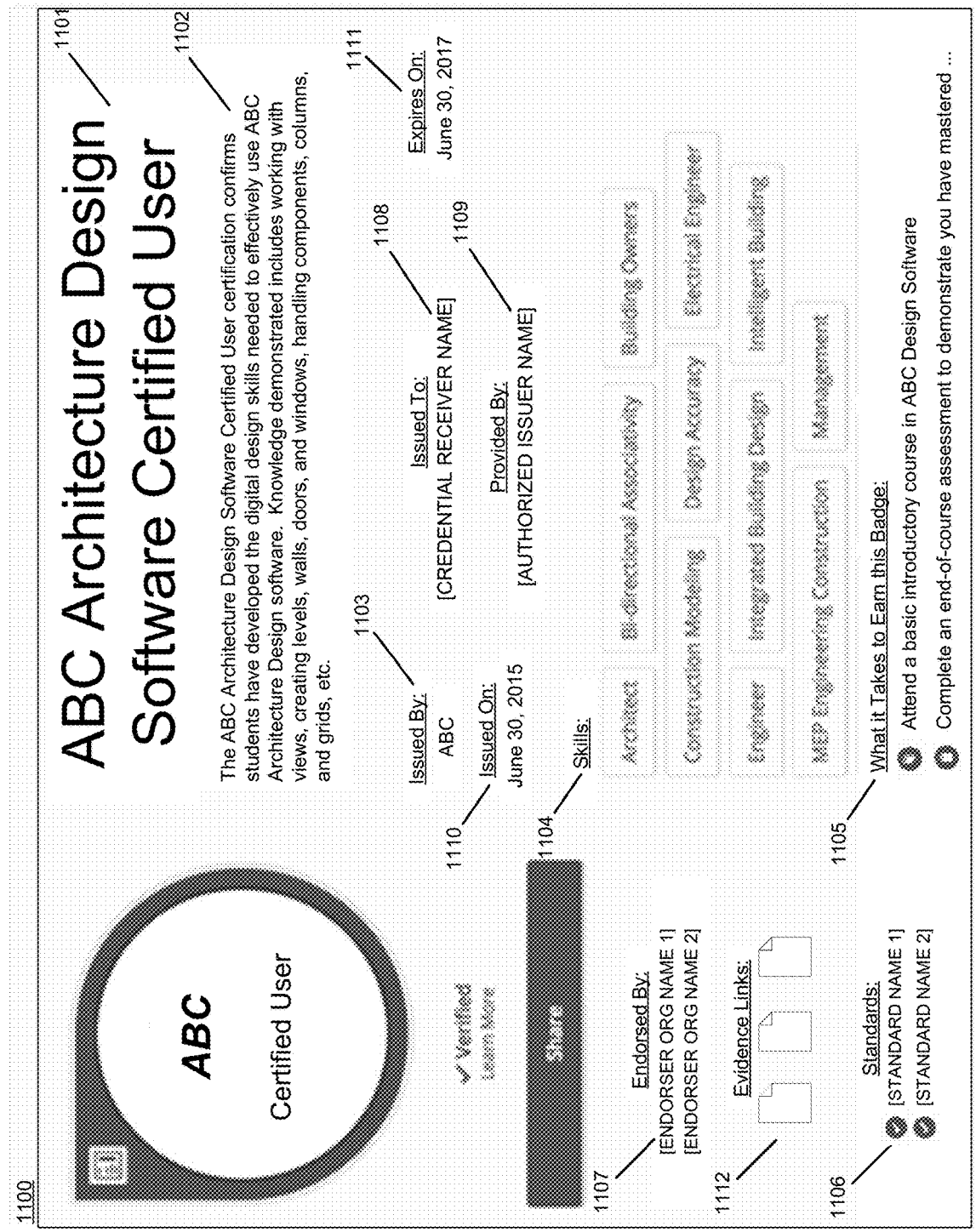
FIG. 11 is an example user interface screen generated by a digital credential platform server to display an issued digital credential, according to one or more embodiments of the disclosure.

Referring briefly to FIG. 11, an example user interface screen is shown displaying a digital credential view (or badge view) of an issued and accepted digital credential 1100 affirming that the credential receiver is an "ABC Architecture Design Software Certified User." In this example, the digital credential 1100 displays a combination of data from the underlying credential template, along with data customized to the specific receiver and/or specific issuer during the issuance process. The data from the from the underlying credential template may include such data as the credential title 1101, description 1102, issuer 1103, skills 1104 associated with the digital credential template 1104, accomplishments/requirements associated with the digital credential template 1105, a set of technical standards 1106 associated with the digital credential template, and a set of endorsements 1107 associated with the digital credential template. The set of endorsements 1107 may identify one or more endorsing entities 650, such as educational institutions, businesses, or technical organizations that have chosen to review and endorse specific digital credential templates. In some examples, only data fields 1101-1107 associated with the digital credential template (and/or any subset/combination of these data fields), which are not specific to any receiver or provider of the credential, may be available and/or retrieved in step 1002. However, in other examples, the digital credential data retrieved in step 1002 may include one or more additional data fields that are customized to the specific receiver and/or specific issuer during the issuance process, such as the credential receiver name 1108, authorized issuer name 1109, credential issue date 1110, credential expiration date 1111, and embedded links 1112 to user-specific documentation supporting the digital credential. In various embodiments, any combination of these digital credential fields may be used in transforming digital credentials into vector queries and performing vector space analyses to determine similar field data objects, as described below.

In this example, step 1002 may be performed in embodiments where the request only identifies particular digital credential or particular users/client devices (e.g., owners, issuers, receivers, etc.), but does not actually include the digital credential data objects. In other embodiments, if the request received in step 1001 includes one or more actual digital credential objects (i.e., not simple data identifying the objects), then step 1002 need not be performed.

In step 1003, the platform server 610 may preprocess and/or tokenize various data retrieved from the digital credentials in step 1002. In some embodiments, the preprocessing and/or tokenization performed in step 1003 for the digital credentials may be similar or identical to preprocess and/or tokenization performed on the field/occupation documents or listings, described above in step 802. For example, the platform server 610 may implement a set of algorithms and/or other techniques to extract and parse particular data fields from the digital credential object(s) retrieved in step 1002. For instance, referring again to the example digital credential view 1100, the platform server 610 may extract various descriptive fields such as the credential title 1101, description 1102, skills 1104, accomplishments/requirements 1105, and/or technical standards 1106. However, in other examples, any combination of the fields of digital credential templates and/or issued digital credentials may be extracted in step 1003.

The preprocessing in step 1003 may including extracting out individual keywords from certain text fields (e.g., the description 1102, requirements 1105, etc.), whereas other data fields may be maintained as lists of separate single-word or multi-word terms (e.g., skills 1104, standards 1106, endorsers 1107, etc.). The preprocessing and/or tokenization in step 1003 also may include performing stemming processes, formatting processes, and/or processes for identifying synonyms or substitute related terms, similar or identical to those discussed above in step 802. Additionally, as discussed above, the platform server 610 may be configured to detect multi-word keywords within certain data fields 1101-1112, whereas single individual word keywords may be extracted and processed separately for other data fields 1101-1112.

In some embodiments, step 1003 also may include aggregating corresponding data fields from multiple different digital credentials retrieved in step 1002. For instance, as discussed above, a single user may have several different associated digital credentials, such as a credential receiver 640 that has earned multiple credentials/badges, or a credential template owner 620 that owns multiple different credential templates, etc. If the request in step 1001 identifies a particular user or entity that has multiple associated digital credentials, then each of the user's multiple credentials may be retrieved in step 1002 and processed in step 1003. In such cases, the platform server 610 may determine that a single aggregated digital credential object may be created by aggregating certain selected data fields from the multiple different digital credentials 1100 associated with the user or entity. For instance, the platform server 610 may identify predetermined matching data fields (e.g., title 1101, description 1102, skills 1104, etc.) in each of user's digital credentials, and may create a single aggregated digital credential object by aggregating the data within each of the predetermined matching data fields. However, in other embodiments, the platform server 610 might not determine that a single aggregated digital credential object should be created, and instead may perform the preprocessing and/or tokenization processes, and the subsequent vector space analysis, separately for each separate digital credential retrieved in step 1002.

After the preprocessing and/or tokenization processes, the resulting digital credential data may be transformed into one or more vector queries in step 1004, and used as input to perform vector space analyses in steps 1005-1007 to select the most similar field data objects from the index structure 725. Initially, in step 1005, the digital credential may be transformed into a vector query that may be input into the same multi-dimensional vector space stored by field data object index 725. In some embodiments, the platform server 610 may use an algorithm to build a vector query from the digital credential, by transforming one or more fields 1101-1112 from the digital credential into a predetermined format. In some cases, the vector query may include one or more text fields (e.g., corresponding to the title field, description field, etc.) and one or more delimited lists of keywords (e.g., corresponding to the skills field, requirements field, standards field, endorsements field, etc.).

In step 1005-1007, the digital credential platform server 610 may initiate a vector space analysis in which the vector query (or queries) generated in step 1004 are compared to each of the vector objects within the field data object index 725, to determine the field data objects most similar to the digital credential(s). In some embodiments, in step 1005 the platform server 610 may initiate the execution of the vector space modeling engine 720 and pass the vector query to the modeling engine 720. As discussed above, in some embodiments, different index structures 725 for field data objects may be constructed based on different external databases 730, or for different regions, geographic locations, and/or different computing environments, etc. Accordingly, in step 1005, if multiple different index structure 725 are available, the platform server 610 may determine and access the appropriate index structure 725 (or appropriate portion thereof) depending on the corresponding region, location, and/or computing environment associated with the requesting client device and/or the digital credentials identified in the request.

In step 1006, the modeling engine 720 may execute the query within a same multi-dimensional vector space into which a plurality of field data objects have been vectorized and imported, for example, as described above in FIG. 8. As shown in this example, the execution of the vector query in step 1006 may include calculating the distance between the vector query and each of the field data objects within the multi-dimensional vector space. In some cases, the distance between the vector query and the a particular field data object within the multi-dimensional vector space may correspond to the angle between these two vectors (i.e., the query and the field data object). For instance, a smaller angle between the vectors within the multi-dimensional space may indicate a higher degree of similarity. In some cases, modeling engine 720 may calculate the angle between two vectors via a multi-step process including multiplying the corresponding components (pairwise) of the vectors and summing those values, normalizing by the product of the lengths of the two vectors, and then using that data to calculate the cosine of the angle between the vectors (i.e., cosine similarity).

In step 1007, the modeling engine 720 and/or other components within the platform server 610 may select one or more of the field data objects stored in index 725. The field data objects may be selected based on the distances between the vectors calculated in step 1006, and the most similar field/occupation documents may be identified as those having the closest distance to the vector query. In some embodiments, the single closest field/occupation document may be selected in step 1006, by identifying the single closest field data object to the vector query based on the digital credential(s). In other embodiments, multiple of the closest field/occupation documents may be selected in step 1006. For example, the algorithms of the platform server 610 may be configured to select the N closest field/occupation documents to the input vector query, or may be configured to select all of the field/occupation documents (regardless of the number returned) within a predefined vector closeness threshold (e.g., calculated cosine similarity >0.7, 0.8, 0.9, etc.).

As noted above, the request for the most similar field/occupation data may be based on a single digital credential (e.g., a template or issued credential), or on multiple digital credentials. For example, a client device 620-660 may provide data identifying a combination of digital credentials, or may provide an entity identifier (e.g., credential receiver ID, template owner ID, template endorser ID, credential issuer ID, etc.) and the platform server 610 may retrieve the set of digital credentials associated with the entity identifier. As discussed above, the platform server 610 may, in some cases, generate a single aggregated digital credential object by aggregating certain data fields from the multiple different digital credentials provided. However, in other cases, the platform server 610 might not create a single aggregated digital credential object, but instead may perform the pre-processing, tokenization, and vector space analysis steps separately for each separate digital credential. Thus, the selection of field data objects in step 1007 may include calculating distances between each of multiple vector queries (one for each digital credential) and each of the field/occupation documents in index 725, and then summing the distances for each field/occupation document to determine which field/occupation documents are closest to the combination of digital credentials provided.

Further, in some embodiments, the selection of the most similar field/occupation data objects in step 1007 need not be based solely on the distances between the vectors calculated in step 1006, but also may include weightings the distances and/or additional factors including within the calculation. For instance, the field/occupation documents 900 and their corresponding field data objects may be weighted based on factors such as field/occupation income, geography, the number of currently available job postings matching the field/occupation, etc. When the platform server 610 determines that one or more of these weighting factors is present for a particular field/occupation data object, it may apply one or more weighting multipliers that will result in a shorter distance calculation between the particular field/occupation data object and the vector query, thereby increasing the chance that that particular field/occupation data object will be selected as a most similar field/occupation in step 1007.

Similar weightings also may be applied to the digital credential vector objects/queries. For example, in embodiments where a client request provides one or more field/occupation documents, and requests to receive the most similar digital credentials, the vectorized digital credential data stored may be weighted by factors including endorsements of the digital credential (or template), the amount of time or costs it takes to obtain the digital credential, the issue date and/or expiration date of the digital credential, etc. Thus, when requesting a set of the most similar (or applicable) digital credentials to a provided field/occupation, such digital credential weighting factors may be applied in within steps 1006 and 1007 to increase or decrease the chances that particulars digital credentials will be selected as a most similar digital credentials to the provided field/occupation data.

Finally, in step 1008, the platform server 610 may generate and transmit the requested digital credential-field mapping data back to the client device 620-660 that initiated the requested. The mapping data may include a set of documents 900 or listings of the fields/occupations corresponding to the field data objects selected in step 1007, which have been determined to be most similar fields/occupations with respect to the digital credentials provided as input to the request. Thus, from the perspective of the client device 620-660, the client may provide one or more digital credentials and/or entity identifiers, and may receive from the platform server 610 the set of fields/occupations that are most similar (or most relevant) to those digital credentials.

Further, although FIG. 10A illustrates an embodiment in which the vector space modeling engine 720 is used to retrieve a set of fields/occupation data objects that are most similar to an input set of digital credentials, other related embodiments may provide the client device 620-660 with the set of most similar/relevant digital credentials based on an input set of field/occupation documents or listings. Thus, in such embodiments, all steps described above in FIG. 8 and FIG. 10A may be reversed with respect to the digital credentials and the corresponding field/occupation documents or listings. From the perspective of the client device 620-660 in these cases, the client may provide one or more fields/occupations (e.g., one or more documents 900 and/or other field/occupation/job identifiers), and the platform server 610 may use similar vector space modeling techniques to provide a set of digital credentials back to the client device that are the most similar (or most relevant) to the field/occupation data provided as input. In still other examples, the digital credential mapping system 700 may support embodiments in which similar/identical vector space modeling techniques are used to provide the set of most similar fields/occupation documents or listings in response to input fields/occupation data provided by the client device 620-660, or to provide the set of most similar digital credentials in response to one or more input digital credentials provided by the client device 620-660.

Figure 10B:
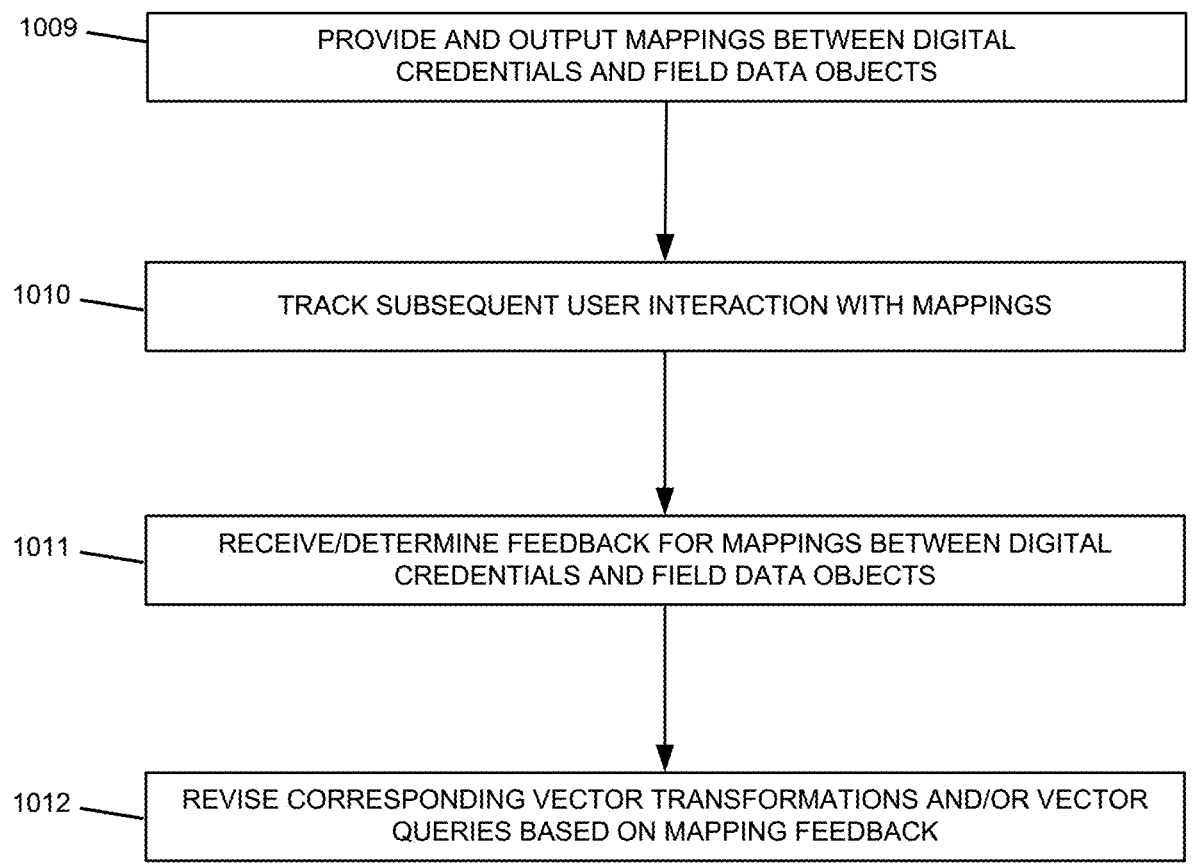
FIG. 10B is a flow diagram illustrating an example process of determining feedback on mappings between digital credentials and corresponding field data, and revising the mapping process based on the feedback, according to one or more embodiments of the disclosure.

Additionally, in some embodiments, feedback mechanisms may be implemented to revise and improve one or both of the processes described above for analyzing and importing field/occupation data from external sources (e.g., as described in FIG. 8) and for determining and retrieving mappings between digital credentials and corresponding fields/occupations (e.g., as described in FIG. 10A). For example, referring now to FIG. 10B, another flow diagram is shown illustrating an example process of determining feedback on mappings between digital credentials and corresponding field data, and revising the mapping process based on the feedback. As with FIG. 10A, the steps in this process may be performed by one or more components in the digital credential mapping system 700 described above. For example, each of steps 1009-1012 may be performed by the digital credential platform server 610 (and/or vector space modeling engine 720), in communication with one or more client devices 620-660. Additionally, as discussed below, steps 1009-1012 may be performed together with steps 1001-1008 in some embodiments, or may be performed entirely separately and independently in other examples.

In step 1009, the digital credential platform server 610 determines and/or outputs a set of digital credential-field mappings to a client device 620-660. Thus, step 1009 may correspond to step 1008 and/or may include the entirety of steps 801-805 and 1001-1008. As discussed above, the mappings may include a set of documents or listings of the fields/occupations that correspond most closely to the digital credentials provided as input by the client device. In some cases, the digital credential platform server 610 may output mappings by visually displaying a list (e.g., a correlated occupation listing) via a user interface. In other examples, the outputting of the mappings data may be transmitted via an API to the client device 620-660. Such output data may include a set of fields/occupations (e.g., the fields/occupations most correlated in the vector space analysis with the digital credentials identified in the request from the client), or a listing of digital credentials (e.g., the digital credentials most correlated in the vector space analysis with the fields/occupations identified in the request from the client), or may include both a digital credentials listing and the correlated field/occupation listings.

In step 1010, following the digital credential-field mappings being output in step 1009, the digital credential platform server 610 may track the interaction of the client user with respect to the mappings output in step 1009. For example, in some embodiments, the user may be presented with a list of mappings within a feedback user interface that allows the user to input a score or rating level (e.g., "Good" or "Bad", 1 to 10, etc.) via the user interface, based on the user's level of satisfaction with the list. For example, for a client user providing a set of digital credentials and receiving a listing of correlated fields/occupations in return, the user may visually review the listing via a user interface screen and provide feedback from within the same user interface indicating how relevant the user believes the received listing of mapping data to be. If the user believe the mapping system has gotten confused and/or the field/occupation mapping data returned is not relevant to the digital credentials input, the user may indicate a low level of satisfaction with the mapping data. However, if the user believes the mapping system has executed properly and that a relevant listing of fields/occupations has been returned, then user may indicate a high level of satisfaction with the mapping data.

Instead of (or in addition to) receiving direct feedback from the user regarding the quality of the field/occupation mapping data, the digital credential platform server 610 also may track the user's behaviors and interactions with the mapping data to indirectly determine the user's feedback. For example, when a list of correlated field/occupation data is output to the user, user interaction data such as (a) the amount of time the user views the lists, (b) the number and amount of time the user hovers over particular field/occupation listings (c) whether or not the user selects and drills down into one or more of the particular field/occupation listings, and/or other user interface-based interest indicators may be detected and analyzed to determine the user's feedback on the field/occupation mapping data. Additionally, as noted above, listings of correlated fields/occupations may be requested by users having different roles in different embodiments, including credential template owners, credential issuers, credential earners, etc. Thus, subsequent user behaviors such as a credential earner registering for and purchasing a particular credential after viewing the corresponding field/occupation mapping data for that credential, may serve as indirect positive feedback for the field/occupation mapping data, while a template owner modifying a credential template after viewing the corresponding field/occupation mapping data for that credential, may serve as indirect negative feedback for the field/occupation mapping data, and so one.

In step 1011, the digital credential platform server 610 may receive and/or determine user feedback on the field/occupation mapping data based on the user interaction tracking described above in 1010. In some embodiments, the digital credential platform server 610 may collect and analyze an aggregated collection of user interaction/user feedback data corresponding to large numbers of different users and/or large numbers of requests of listings of correlated fields/occupations, in order to determine an overall aggregated user feedback score.

Finally, in In step 1012, the digital credential platform server 610 may revise one or more aspects of the mapping process, based on the received and/or determined user feedback from step 1011. The revisions in step 1012 may be performed with the goal of ensuring that future mappings output by the digital credential platform server 610, between a set of digital credentials and corresponding field/occupation listings (or vice versa), reflect the feedback received/determined in step 1012 for all previously output mappings.

In some embodiments, the revision process may include re-tokenizing and/or re-importing the field data objects for any fields/occupations related to the mapping feedback. Thus, existing field data objects may be deleted from the index, and steps 802 and 805 may be re-executed for certain fields/occupations. During the re-execution of these processes, certain data fields and/or terms from the fields/occupation listings may be revised, ignored, and/or weighted more or less in order to affect the output vectors into which these field/occupation listings are transformed within the multi-dimensional vector space.

Additionally or alternatively, the digital credentials that are related to the mapping feedback received in step 1011 also may be re-preprocessed and re-tokenized (step 1003), and re-transformed into vector queries (steps 1004). During the re-tokenization and re-generation of vector queries based on digital credentials, certain data fields and/or terms from the digital credential objects may be revises, ignored, and/or weighted more or less in order to affect the output vector query that is generated based on the digital credentials. After the re-tokenization and re-generation of vector queries based on digital credentials, the digital credential platform server 610 also may update the distance calculations between the query vector and the related field data objects (step 1006), in order to assure that distance has changed in the desired direction. That is, in response to positive feedback received for a set of digital credential to field/occupation listings, the distance between the query vector and those field data object vectors should be reduced, while in response to negative feedback for a set of digital credential to field/occupation listings, the distance between the query vector and those field data object vectors should be increased.

In accordance with additional aspects of the disclosure, digital credential analysis tools and functionality may be provided to analyze and/or score particular digital credential objects during the processes of designing and/or issuing digital credentials. For example, during the process of creating (or revising) a digital credential view for a newly available digital credential, the digital credential platform server 610 may provide the client device (e.g., a digital credential template owner client 620 or digital credential issuer client 630) with tools to allow to the client to perform a number of quality analyses on the digital credential and/or to preview and confirm the set of field/occupation listings that will correspond most closely to the new digital credential. Thus, during the design of the new digital credential view, the client may modify various descriptive fields, skills, keywords, etc., to produce a higher-quality digital credential view that is targeted more specifically to fields/occupations related to that digital credential.

Figure 12:
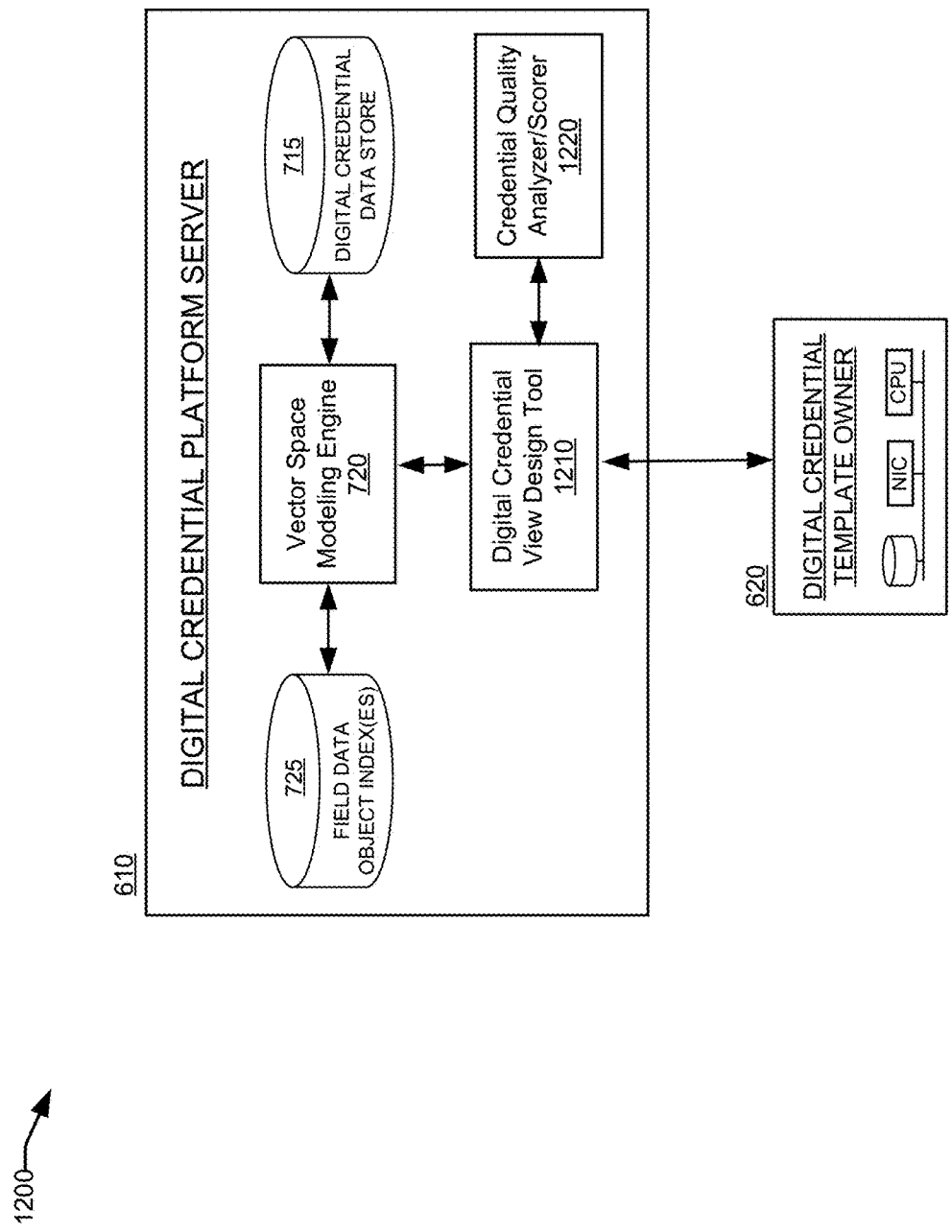
FIG. 12 is an block diagram illustrating an example system for mapping using vector space modeling, including a digital credential template design tool, according to one or more embodiments of the disclosure.

Referring now to FIG. 12, a block diagram is shown illustrating an example of digital credential mapping system 1200 configured with a digital credential view design tool 1210. As shown in this example, digital credential template owner client devices 620 (and/or potential other types of clients, such as digital credential issuers, endorsers, etc.), may interact with the digital credential view design tool 1210 to import new types of digital credentials and to customize the particular view for the new types of digital credentials. As discussed below in more detail, the digital credential view design tool 1210 may include various analysis functionality (e.g., a digital credential quality analyzer/scorer 1220 and a vector space modeling engine 720) along with corresponding user interfaces to allow users to create, edit, analyze/score, and then revise digital credential views. After a set of analyses have been completed, the digital credential template owner 620 may use the design tool 1210 to revise a digital credential view and perform additional updated analyses for the revised view, or may save the digital credential view as a final view within the digital credential platform server 610.

In some examples, the digital credential mapping system 1200 may correspond to the same system 600 described above in FIG. 6. That is, the same digital credential platform server 610 may be implement and support one or more versions of a digital credential view design tool 1210 and perform the associated analyses and user interface support for certain clients authorized to use the design tool 1210 for particular digital credentials. Thus, digital credential mapping system 1200 may also perform to the generation, management, and tracking of digital credentials and templates discussed above, as well as the mapping of digital credentials to field data objects. However, in other examples, a digital credential design tool 1210 may be implemented entirely separately from any digital credential management system 1200. For instance, in some embodiments, digital credential design tool 1210 may be implemented as a standalone client-based application that optionally accesses the digital credential management system 1200 (e.g., only if access is permitted) to retrieve the corresponding set of fields/occupation listings responsive to the digital credential view currently being designed by the template owner.

Figure 13:
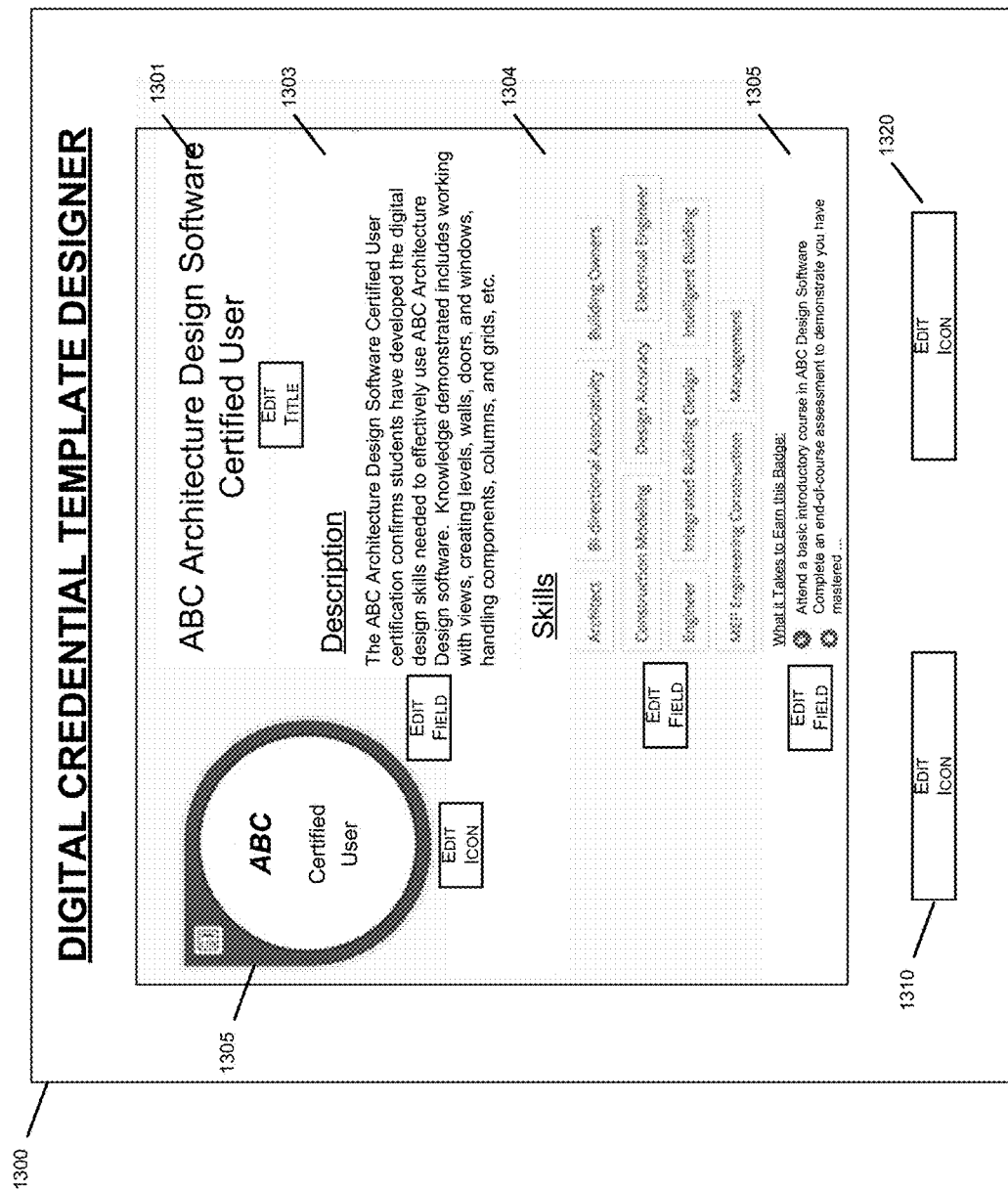
FIG. 13 is an example user interface screen of a digital credential template design tool, according to one or more embodiments of the disclosure.

Referring now to FIG. 13, an example user interface screen 1300 is shown associated with a digital credential view (or badge view) design tool 1210. In this user interface, the digital credential being created/modified may be the same example digital credential type illustrated above in FIG. 11 (e.g., the "ABC Architecture Design Software Certified User" digital credential). In the illustrative user interface 1300, several data fields for the template of this digital credential type are displayed, including the template title 1301, graphical icon 1320, template description 1303, list of keyword skills 1304, and accomplishments/requirements associated with the digital credential template 1305. Each of these data field may be editable via the user interface 1300 of the digital credential view design tool 1210.

Additionally, user interface 1300 includes a button 1310 allowing the user to generate and view a listing of the closest matching fields/occupations based on the data fields of the digital credential currently displayed. Upon selection of button 1310, the digital credential view design tool 1210 may initiate a process similar to that discussed above in FIG. 10A, in which the in-progress digital credential currently shown within the design tool 1210 may be parsed and tokenized, data field by data field, converted into a vector query, and then projected into one or more multi-dimensional vector spaces by the same digital credential platform server 610 in order to determine the listing of closest field/occupation vectors. After determining the closest matching fields/occupations, the design tool 1210 may displayed ranked list (e.g., the top N matches, or all matches within a certain vector closeness threshold, etc.) via the user interface 1300. This list of the closest matching fields/occupations may allow the user to determine whether or not the digital credential template being designed is using the appropriate description language, skills, and the like, in order to clearly describe the credential, thus making the new digital credential more likely to be noticed by and attractive to the intended target audience for that digital credential.

User interface 1300 also includes a second button 1320 allowing the user to execute and view reports and/or scores based on one or more digital credential quality analyses, based on the data fields of the digital credential currently displayed. As discussed below in more detail, a number of different digital credential quality analyses may be executed, each having a corresponding score and/or explanatory report that may be output to the user following the execution. These digital credential quality analyses may include, for example, a digital credential data field quality analysis and a number of analyses based on the matching field/occupations (e.g., relevant field/occupation matching analysis, a narrowly targeted analysis, a consistency analysis, and marketability/expected salary analysis, etc.). This example digital credential quality analyses are described below in further detail. Using the user interface 1300, a digital credential template owner 620 may execute one or more of these analyses, view the resulting scores/reports, make any desired modifications to the digital credential template data fields (e.g., 1301-1305), re-run the analyses, and so on, until the client user 620 is satisfied with the results of the analyses. Additionally, although these examples refer to designing a single digital credential template only, these processes may be expanded so that similar analyses may be performed on a combination of related digital credential templates. For instance, a digital credential template owner 620 in the process of creating a new digital credential template offering may run these analyses on the combination of the new template and the package/group of existing related templates, in order to determine how the new template may affect the closest matching fields/occupations and other data metrics for the digital credential package as a whole.

Figure 14:
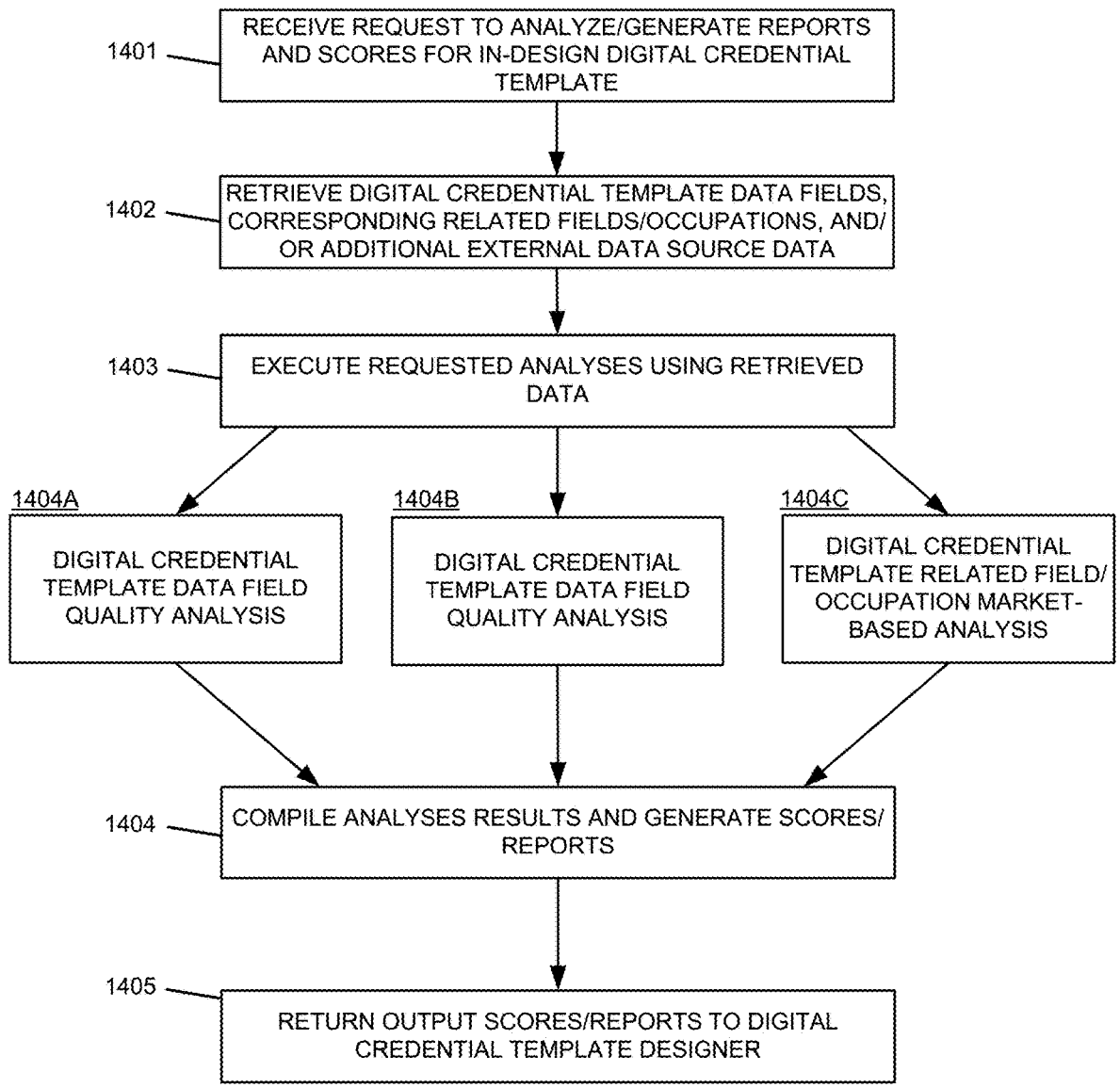
FIG. 14 is a flow diagram illustrating an example process of analyzing a digital credential template during design, according to one or more embodiments of the disclosure.

Referring now to FIG. 14, a flow diagram is shown illustrating an example process of performing digital credential quality analyses and generating corresponding scores/reports for a digital credential being designed via the digital credential design tool 1210. As described below, the steps in this process may be performed by one or more components in the digital credential mapping system 1400 described above, for example, the digital credential design tool 1210 which may invoke one or more credential quality analyzer/scorer components 1220 and/or vector space modeling engines 720. However, it should be understood that the various features and processes described herein, including analyzing digital credential template data during a template design view process, and generating and output template quality scores and reports, need not be limited to the specific systems and hardware implementations described above, but also may be performed on the various other systems and hardware implementations described herein.

In step 1401, a digital credential design tool 1210 executing within a digital credential platform server 610 (or which may be executing separately and independently, as discussed above) may receive a request to generate one or more quality scores and/or reports based on a particular digital credential template. As discussed in the above examples, the request may be initiated via a user interface 1300 of template design tool 1210 for a newly-designed digital template. However, in other examples, the performing of digital credential quality analyses and generating of corresponding scores/reports need not be performed only during the digital template design process but may performed at any time during the lifecycle of a digital credential (e.g., in response to a determination that the digital credential is difficult to search for, or is not being used/purchased by digital credential earners at the desired rate, etc.). As noted above, the request received in step 1401 may identify one or more types of analysis to be performed (e.g., by selecting the quality scores and/or sub-reports to generate), which may include, for example, a digital credential data field quality analysis, a relevant field/occupation matching analysis, a narrowly targeted field/occupation analysis, a consistency in field/occupation analysis, a marketability/expected salary of field/occupation analysis, and so on.

In step 1402, in response to the request received in step 1401, the digital credential design tool 1210 may retrieve the current data fields from the digital credential template currently being designed (e.g., data fields 1301-1305). Additionally, the design tool 1210 may retrieve (and generate first, if necessary) the set of closest matching fields/occupations based on the data fields 1301-1305 of the digital credential currently displayed in the user interface 1300. Thus, the design tool 1210 may initiate a process similar to that discussed above in FIG. 10A, in which the in-progress digital credential currently shown in the user interface 1300 may be parsed and tokenized, data field by data field, converted into a vector query, and then projected into one or more multi-dimensional vector spaces by the same digital credential platform server 610 in order to determine the listing of closest field/occupation vectors.

Additionally, in some embodiments, data from additional data sources may be retrieved in step 1402. For example, relevant data from additional data stores of the credential platform server 610 may be retrieved, such as data correlations between current field/employment data and the sets of digital credentials for workers in those fields/occupations. Within the report generation processes below, this correlation data may be used to score and/or determining the quality and relevancy of the closest field/occupation vectors to the current digital credential template being designed.

In step 1403, depending on the particular scores/reports requested in the step 1401, the corresponding analyses may be executed by the digital credential design tool 1210, using the data retrieved in step 1402. As shown in this example, some or all of the analyses may be performed (along with any others discussed herein) in parallel or sequentially, in accordance with the score/report data requested by the designer via the user interface 1300.

In step 1403A, the digital credential design tool 1210 may execute a process to perform an analysis of the quality of the data fields 1301-1305 within the digital credential being designed. The analysis in step 1403A may including analyzing the length, field size, grammar and spelling, word choices, and clarity of each of the data fields 1301-1305 within the digital credential being designed. For example, titles, descriptions, skill keywords, and/or accomplishments/requirements field having too few words (e.g., below a predetermined word or character threshold) may be undesirable as not descriptive enough, but those same fields having too many words (e.g., above a separate predetermined word or character threshold) also may be undesirable as being too narrow so as to exclude potentially matching fields/occupations or too wordy or lengthy so as to lose the attention to potential earners reading the template description and other fields. Additionally, in some cases, analysis in step 403A also identify technologies or industry-based keywords that are out of date, or potentially confusing because they are used in multiple different types of industries, and may flag such terms for the report and/or decrease the quality score based on such terms.

In step 1403B, the digital credential design tool 1210 may execute a process to perform an analysis of the numbers and quality of matches of related fields/occupations to the digital credential template current being designed. As noted above, the listing of related fields/occupations may retrieved from and/or generated by the vector space modeling engine 720 using any or all of the techniques discussed above. The listing of fields/occupations for the currently digital credential template may be the set of closest field vectors to the vector query generated based on the data fields 1301-1305 of the digital credential template. In the analysis in step 1403B, this listing of related fields/occupations may be examined to determine how many fields/occupations fall with different threshold levels of vector closeness within the multi-dimensional vector space. For example, a list of the 10 closest matching fields/occupations might be less valuable if none of these 10 fields/occupations is within a minimum closeness threshold. Similarly, if each of the closest 10 fields/occupations are very close to the vector query of the digital credential template within the vector space, but 100 additional fields/occupations are also very close and almost just as closest as the closest 10, then the identification of the closest 10 matches would also be less valuable. In both of these examples, the analysis in step 403A may include such analyses within the report and/or decrease the quality score based on such analyses. In contrast, if an appropriate number (e.g., mid-range) of the closest fields/occupations to the digital credential template, and if there is a significant difference in vector-space closeness between the closest tier of matches and the further removed vectors, the analysis in step 403B may indicate this and/or increase the quality score based on such analyses.

In step 1403C, the digital credential design tool 1210 may execute a process to perform one or more market-based analyses of the matches of related fields/occupations to the digital credential template. For example, a consistency analysis may be performed in 1403C, which measures the relative consistency (e.g., using overlap of industry, skills, education, etc.) between the closest matches in the listing of related fields/occupations for the digital credential template being designed. A lack of internal consistency among the listing of closest matching related fields/occupations may indicate a lack of clarity or high level of ambiguity within the data fields 1301-1305 of the digital credential template. To the contrary, high of industry-level consistency, educational consistency, skills consistency, etc., among the listing of closest matching related fields/occupations may indicate a more clarity and less ambiguity within the data fields 1301-1305 of the digital credential template. Additionally, in step 1403C, a market-based expected salary analysis may be performed using the most closely matching of related fields/occupations to the digital credential being designed. In some cases, the designer of a digital credential template may desire the credential to be highly marketable, and may design the template accordingly to match with higher paying field/occupations and/or more desirable market sectors.

In step 1404, the digital credential design tool 1210 completes the execution of and receives from each of the analyses performed in step 1403, after which design tool 1210 may aggregate the reports/scores and format the analysis data into output form. As noted above, different subsets of analyses may be performed in different combinations, and additionally may be performed for a single digital credential template (e.g., the template currently shown within the user interface 1300 of the design tool 1210) or for a group/package of related digital credential templates (e.g., a credential package modified to include the template currently shown within the user interface 1300 of the design tool 1210). Then, in step 1405, the digital credential design tool 1210 may output the requested reports/quality scores to the client 620, for example, via the user interface 1300 and/or by transmitting the report/score data over a separate transmission channel.

A number of variations and modifications of the disclosed embodiments can also be used. Specific details are given in the above description to provide a thorough understanding of the embodiments. However, it is understood that the embodiments may be practiced without these specific details. For example, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

What is claimed is:

1. A digital credential mapping system comprising:
   a digital credential platform server, comprising:
   a processing unit comprising one or more processors;
   one or more network interfaces configured to receive digital credential objects and transmit mapping data; and
   memory coupled with and readable by the processing unit and storing therein a set of instructions which, when executed by the processing unit, causes the digital credential platform server to:
   receive data identifying one or more digital credential objects from a first client device;
   determine whether the first client device is a digital credential template owner device, a digital credential issuer device, or a digital credential receiver device;
   determine a region, industry, or education level associated with the first client device or a user of the first client device;
   tokenize each of the one or more digital credential objects, said tokenization including extracting and modifying data fields within each of the one or more digital credential objects;
   transform the one or more digital credential objects into a first vector within a multi-dimensional vector space;
   access an index structure storing a plurality of field data objects, wherein the index structure is determined by the region, industry, or education level;
   for each particular field data object in the plurality of field data objects stored in the index structure:
   transform the particular field data object into a separate vector within the same multi-dimensional vector space of the first vector; and
   calculate the vector distance within the multi-dimensional vector space between the separate vector and the first vector;
   select one or more of the plurality of field data objects, based on the vector distances calculated between the first vector and the plurality of separate vectors within the same multi-dimensional vector space;
   generate a mapping between the one or more digital credential objects and the selected one or more field data objects; and
   transmit data identifying the mapping between the digital credential objects and the field data objects, to the first client device, wherein the data identifying the mapping is generated differently based on whether the first client device is a digital credential template owner device, a digital credential issuer device, or a digital credential receiver device; and one or more client devices, the one or more client devices including at least the first client device, wherein each of the one or more client devices comprises:

a processing unit comprising one or more processors;

one or more network interfaces; and memory coupled with and readable by the processing unit and storing therein a set of instructions which, when executed by the processing unit, causes the client device to:

transmit data identifying one or more digital credential objects to the digital credential platform server; and receive, from the digital credential platform server, data identifying one or more mappings between the one or more digital credential objects and one or more field data objects.

2. The digital credential mapping system of claim 1, wherein the one or more client devices comprises a plurality of client devices including:

one or more digital credential template owner devices, each digital credential template owner device comprising:

a processing unit comprising one or more processors;

one or more network interfaces configured to securely transmit data to the digital credential platform server; and memory coupled with and readable by the processing unit and storing therein a set of instructions which, when executed by the processing unit, causes the digital credential template owner device to transmit one or more digital credential templates to the digital credential platform server;

one or more digital credential issuer devices, each digital credential issuer device comprising:

a processing unit comprising one or more processors;

one or more network interfaces configured to securely transmit data to the digital credential platform server; and memory coupled with and readable by the processing unit and storing therein a set of instructions which, when executed by the processing unit, causes the digital credential issuer device to determine one or more credential receivers that are eligible to receive a digital credential based on the one or more digital credential templates, generated digital credentials based on a digital credential template and user data associated with the one or more credential receivers, and transmit data confirming the issuance of the generated digital credentials to the digital credential platform server; and one or more digital credential receiver devices, each credential receiver device comprising:

a processing unit comprising one or more processors;

one or more network interfaces configured to securely transmit data to the digital credential platform server; and memory coupled with and readable by the processing unit and storing therein a set of instructions which, when executed by the processing unit, causes the credential receiver device to receive, from the digital credential platform server, data confirming that one or more digital credentials have been issued to a credential receiver associated with the credential receiver device, by one or more of the digital credential issuer devices.

3. The digital credential mapping system of claim 1, wherein the received data identifying one or more digital credential objects comprises a plurality of separate digital credential objects, and wherein the tokenization of the plurality of separate digital credential objects comprises:

identifying one or more matching data fields within each of the plurality of separate digital credential objects; and creating a single aggregated digital credential object, by aggregating the data within each of the matching data fields of each of the separate digital credential objects wherein only the single aggregated digital credential object is transformed into the first vector within the multi-dimensional vector space.

4. The digital credential mapping system of claim 1, wherein the received data identifying one or more digital credential objects comprises a plurality of digital credential objects, and wherein each of the plurality digital credential objects is separately tokenized and separately transformed into a vector within the multi-dimensional vector space, and wherein the selection of the plurality of field data objects is based on a plurality of vector distances calculated between the first vector and each of the plurality of separately transformed vectors corresponding to the plurality digital credential objects.

5. The digital credential mapping system of claim 1, wherein calculating the plurality of vector distances between the first vector and each of the plurality of separately transformed vectors corresponding to the plurality digital credential objects further comprises:

retrieving a weight value associated with each of the plurality digital credential objects; and applying the weight value for each of the plurality digital credential objects to the calculation of the distance between the corresponding transformed vector and the first vector.

6. The digital credential mapping system of claim 1, wherein the tokenization of a first digital credential object comprises parsing a first data field of the first digital credential object to generate a plurality of individual keywords, stemming each of the plurality of keywords, and determining one or more substitute keywords associated with each of the plurality of keywords.

7. The digital credential mapping system of claim 6, wherein the tokenization of the first digital credential object further comprises identifying a plurality of multi-word keywords within a second data field of the first digital credential object, stemming each of the multi-word keywords, and determining one or more substitute keywords associated with each of the multi-word keywords, wherein the second data field is not parsed to generate a plurality of individual keywords from the multi-word keywords.

8. The digital credential mapping system of claim 1, wherein the index structure storing the plurality of field data objects comprises a high-performance text search engine.

9. The digital credential mapping system of claim 8, wherein accessing the index structure comprises:

determining geographic location data associated with the one or more digital credential objects; and selecting the index structure from a plurality of possible index structures, based on the geographic location data associated with the digital credential objects.

10. A method of mapping digital credentials, comprising:
receiving, by a digital credential platform server and from a first client device, data identifying one or more digital credential objects;
determining whether the first client device is a digital credential template owner device, a digital credential issuer device, or a digital credential receiver device;
tokenizing, by the digital credential platform server, each of the one or more digital credential objects, said tokenization including extracting and modifying data fields within each of the one or more digital credential objects;
transforming, by the digital credential platform server, the one or more digital credential objects into a first vector within a multi-dimensional vector space;
accessing, by the digital credential platform server, an index structure storing a plurality of field data objects;
for each particular field data object in the plurality of field data objects stored in the index structure:
 transforming, by the digital credential platform server, the particular field data object into a separate vector within the same multi-dimensional vector space of the first vector; and
 calculating, by the digital credential platform server, the vector distance within the multi-dimensional vector space between the separate vector and the first vector;
selecting, by the digital credential platform server, one or more of the plurality of field data objects, based on the vector distances calculated between the first vector and the plurality of separate vectors within the same multi-dimensional vector space;
generating, by the digital credential platform server, a mapping between the one or more digital credential objects and the selected one or more field data objects; and
transmitting, by the digital credential platform server, data identifying the mapping between the digital credential objects and the field data objects, to the first client device, wherein the data identifying the mapping is generated differently based on whether the first client device is a digital credential template owner device, a digital credential issuer device, or a digital credential receiver device.

11. The method of mapping digital credentials of claim 10, wherein the received data identifying one or more digital credential objects comprises a plurality of separate digital credential objects, and wherein the tokenization of the plurality of separate digital credential objects comprises:
identifying one or more matching data fields within each of the plurality of separate digital credential objects; and
creating a single aggregated digital credential object, by aggregating the data within each of the matching data fields of each of the separate digital credential objects wherein only the single aggregated digital credential object is transformed into the first vector within the multi-dimensional vector space.

12. The method of mapping digital credentials of claim 10, wherein the received data identifying one or more digital credential objects comprises a plurality of digital credential objects, and wherein each of the plurality digital credential objects is separately tokenized and separately transformed into a vector within the multi-dimensional vector space, and wherein the selection of the plurality of field data objects is based on a plurality of vector distances calculated between the first vector and each of the plurality of separately transformed vectors corresponding to the plurality digital credential objects.

13. The method of mapping digital credentials of claim 10, wherein calculating the plurality of vector distances between the first vector and each of the plurality of separately transformed vectors corresponding to the plurality digital credential objects further comprises:
retrieving a weight value associated with each of the plurality digital credential objects; and
applying the weight value for each of the plurality digital credential objects to the calculation of the distance between the corresponding transformed vector and the first vector.

14. The method of mapping digital credentials of claim 10, wherein the index structure storing the plurality of field data objects comprises a high-performance text search engine, and wherein accessing the index structure comprises:
determining geographic location data associated with the one or more digital credential objects; and
selecting the index structure from a plurality of possible index structures, based on the geographic location data associated with the digital credential objects.

15. A non-transitory computer-readable medium, having instructions stored therein, which when executed cause a computer to perform a set of operations comprising:
receiving, by a digital credential platform server and from a first client device, data identifying one or more digital credential objects;
determining a device type of the first client device;
tokenizing, by the digital credential platform server, each of the one or more digital credential objects, said tokenization including extracting and modifying data fields within each of the one or more digital credential objects;
transforming, by the digital credential platform server, the one or more digital credential objects into a first vector within a multi-dimensional vector space;
accessing, by the digital credential platform server, an index structure storing a plurality of field data objects;
for each particular field data object in the plurality of field data objects stored in the index structure:
 transforming, by the digital credential platform server, the particular field data object into a separate vector within the same multi-dimensional vector space of the first vector; and
 calculating, by the digital credential platform server, the vector distance within the multi-dimensional vector space between the separate vector and the first vector;
selecting, by the digital credential platform server, one or more of the plurality of field data objects, based on the vector distances calculated between the first vector and the plurality of separate vectors within the same multi-dimensional vector space;
generating, by the digital credential platform server, a mapping between the one or more digital credential objects and the selected one or more field data objects; and
transmitting, by the digital credential platform server, data identifying the mapping between the digital credential objects and the data field objects, to the first client device, wherein the data identifying the mapping is generated differently based on the device type of the first the first client device.

16. The non-transitory computer-readable medium of claim 15, wherein the device type is a digital credential template owner device, a digital credential issuer device, or a digital credential receiver device.

17. The non-transitory computer-readable medium of claim 15, wherein calculating the plurality of vector distances between the first vector and each of the plurality of separately transformed vectors corresponding to the plurality digital credential objects further comprises:
   retrieving a weight value associated with each of the plurality digital credential objects; and
   applying the weight value for each of the plurality digital credential objects to the calculation of the distance between the corresponding transformed vector and the first vector.

18. The non-transitory computer-readable medium of claim 15, wherein the index structure storing the plurality of field data objects comprises a high-performance text search engine, and wherein accessing the index structure comprises:
   determining geographic location data associated with the one or more digital credential objects; and
   selecting the index structure from a plurality of possible index structures, based on the geographic location data associated with the digital credential objects.

* * * * *